(12) United States Patent
Sadek et al.

(10) Patent No.: US 11,385,100 B2
(45) Date of Patent: Jul. 12, 2022

(54) INCREASED SPECTROMETER FIELD OF VIEW

(71) Applicant: Si-Ware Systems, Cairo (EG)

(72) Inventors: Mohamed Ahmed Sadek, Cairo (EG); Shady Labib, Cairo (EG); Mostafa Medhat, Cairo (EG); Bassem Mortada, Cairo (EG)

(73) Assignee: SI-WARE SYSTEMS, Cairo (EG)

( * ) Notice: Subject to any disclaimer, the term of this patent is extended or adjusted under 35 U.S.C. 154(b) by 69 days.

(21) Appl. No.: 16/931,237

(22) Filed: Jul. 16, 2020

(65) Prior Publication Data

US 2021/0018365 A1 Jan. 21, 2021

Related U.S. Application Data

(60) Provisional application No. 62/874,925, filed on Jul. 16, 2019.

(51) Int. Cl.
| | | |
|---|---|---|
| *G01J 3/28* | (2006.01) | |
| *G01J 3/02* | (2006.01) | |
| *G01J 3/10* | (2006.01) | |
| *G01J 3/42* | (2006.01) | |
| *G02B 13/06* | (2006.01) | |
| *G02B 27/14* | (2006.01) | |

(52) U.S. Cl.
CPC ............. *G01J 3/021* (2013.01); *G01J 3/0208* (2013.01); *G01J 3/10* (2013.01); *G01J 3/42* (2013.01); *G02B 13/06* (2013.01); *G02B 27/14* (2013.01)

(58) Field of Classification Search
CPC ...... G01J 3/02; G01J 3/44; G01J 3/021; G01J 3/0208; G01J 3/10; G01J 3/42; G01J 3/0289; G02B 13/06; G02B 27/14
See application file for complete search history.

(56) References Cited

U.S. PATENT DOCUMENTS 6,323,949 B1 * 11/2001 Lading .................... G01P 3/366
356/28.5
2012/0274937 A1 11/2012 Byron et al.

FOREIGN PATENT DOCUMENTS

| EP | 2690485 A1 | 1/2014 |
|---|---|---|
| EP | 3299861 A1 | 3/2018 |
| WO | 2015118535 A1 | 8/2015 |
| WO | 2016054609 A1 | 4/2016 |
| WO | 2019191698 A2 | 10/2019 |

OTHER PUBLICATIONS

International Search Report and Written Opinion, PCT/US2020/042410, dated Oct. 2, 2020.

* cited by examiner

*Primary Examiner* — Abdullahi Nur
(74) *Attorney, Agent, or Firm* — Loza & Loza, LLP; Holly L. Rudnick

(57) ABSTRACT

Aspects relate to mechanisms for increasing the field of view of a spectrometer. An optical device may be configured to simultaneously couple light from different locations (spots) on a sample to the spectrometer to effectively increase the spectrometer field of view. The optical device can include a beam combiner and at least one reflector to reflect light beams from respective spots on the sample towards the beam combiner. The beam combiner can combine the received light beams from the different spots to produce a combined light beam that may be input to the spectrometer.

28 Claims, 20 Drawing Sheets

INCREASED SPECTROMETER FIELD OF VIEW

PRIORITY CLAIM

This application claims priority to and the benefit of Provisional Application No. 62/874,925, filed in the U.S. Patent and Trademark Office on Jul. 16, 2019, the entire content of which is incorporated herein by reference as if fully set forth below in its entirety and for all applicable purposes.

TECHNICAL FIELD

The technology discussed below relates generally to optical spectroscopy including diffuse reflectance and transmission spectroscopy, and in particular to mechanisms to increase the field of view of the spectrometer.

BACKGROUND

A spectrometer measures a single-beam spectrum (e.g., a power spectral density (PSD)). The intensity of the single-beam spectrum is proportional to the power of the radiation reaching the detector. In some use cases, light may be directed towards a sample and the light transmitted and/or reflected from the sample may be input to the spectrometer to obtain the spectrum of the light from the sample. For example, spectroscopy may be utilized to characterize the chemical content of solids, liquids and gases. Spectrometers view and interact with the sample under test using various mechanisms, such as transmission or diffuse reflectance sampling. Transmission is commonly used with liquid samples. In this configuration, the light passes through the sample under test and then is coupled into the spectrometer after interacting with the molecules of the sample. In diffuse reflectance sampling, the light is incident on the sample under test and the scattered light from the sample is collected and coupled into the spectrometer system.

In both cases, the light collected by the spectrometer interacts with a limited portion (or spot size) of the sample. The portion of the sample (spot size) viewed by the spectrometer may be referred to herein as the field of view of the spectrometer. In applications involving inhomogenous samples or samples that have a large particle size, measuring a small spot size may not be representative of the sample spectral properties. This can be observed in the measurement results with large variations across different locations on the sample. For example, in grain analysis, the particle size can vary from 5-20 mm, and accordingly, the optical system of the spectrometer should be able to accommodate this large spot size. Conventional spectrometers may require special sample preparations to overcome this limitation. Typically, this involves grinding the sample and proper mixing to form a homogeneous surface. Such a sample preparation process, while feasible in the laboratory, may not be an easy task in the field for a portable spectrometer.

The spot size collected from the sample is dependent on the spectrometer etendue, which is a representation of the spectrometer input aperture and its acceptance angle. One way to increase the coupled spot area is by rotating the sample to collect different spots on the sample during measurement. For example, the sample can be measured several times at different positions and then the readings can be averaged together. However, this involves using moving parts, such as a motor, to rotate the sample plate. In addition, the sample measurement time may be increased by separately measuring the different spots on the sample.

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to mechanisms for increasing the field of view of a spectrometer. In an aspect, an optical device may be configured to simultaneously couple light from different locations (spots) on a sample to the spectrometer to effectively increase the spectrometer field of view. The optical device can include a beam combiner and at least one reflector to reflect light beams from respective spots on the sample towards the beam combiner. The beam combiner can combine the received light beams from the different spots to produce a combined light beam that may be input to the spectrometer.

In an example, an optical device including a beam combiner, at least one reflector, and a spectrometer is disclosed. The beam combiner is optically coupled to receive a first light beam from a first spot on a sample and a second light beam from a second spot different from the first spot on the sample. The beam combiner is further configured to combine the first light beam and the second light beam to produce a combined light beam. The at least one reflector is optically coupled to reflect at least one of the first light beam or the second light beam from the sample towards the beam combiner. The spectrometer is optically coupled to receive the combined light beam at an input thereof and configured to obtain a spectrum of an extended spot area on the sample based on the combined light beam. The extended spot area can include the first spot and the second spot.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
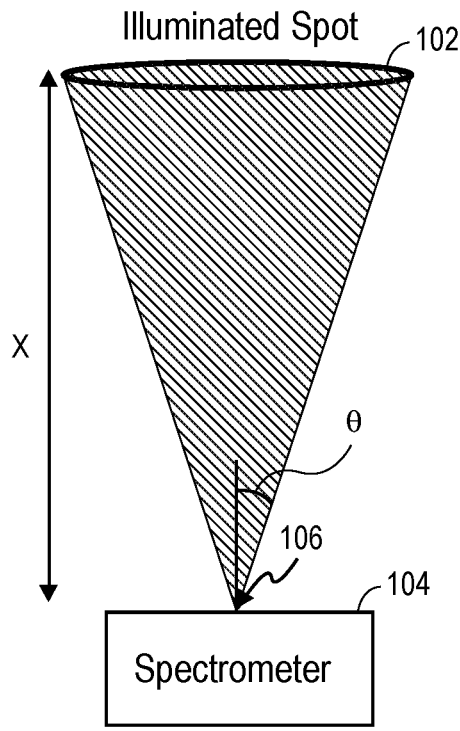
FIG. 1 is a diagram illustrating a spectrometer as an optical system according to some aspects.

FIG. 1 is a diagram illustrating a spectrometer 104 as an optical system according to some aspects. The spectrometer 104 may be, for example, a Fourier Transform infrared (FTIR) spectrometer. In some examples, the spectrometer 104 may include a Michelson interferometer or a Fabry-Perot interferometer.

The spectrometer 104 as an optical system can be simplified as an aperture 106 with certain dimensions (e.g., diameter) and an acceptance angle $\theta$. The acceptance angle $\theta$ represents an angle of a head of a cone of light optically coupled into the spectrometer 104 from an illuminated spot 102 on a sample. For example, light passing through the sample or reflected from (e.g., scattered from) the sample may be optically coupled from the illuminated spot 102 towards the spectrometer 104. The throughput of the spectrometer 104 shown in FIG. 1 may be written as:

$$\text{Throughput} \propto \text{aperture diameter}^2 \times \sin^2(\theta). \quad \text{(Equation 1)}$$

The distance between the sample interface and the spectrometer input surface may be represented as X, as shown in FIG. 1. If the distance X is large as compared to the diameter of the aperture 106, and the collected spot area of the illuminated spot 102 is much larger than the area of the aperture 106, the effective area (e.g., field of view) seen by the spectrometer may be approximated by the following relation:

$$\text{Spot diameter} = 2X \tan(\theta). \quad \text{(Equation 2)}$$

Based on Equations 1 and 2 above, the key limitation in spectrometer optical systems in terms of the collection spot size may be considered the acceptance angle $\theta$ of the system. In miniaturized spectrometers where the input aperture 106 has a small area and acceptance angle, the performance of such spectrometers may be limited to homogeneous samples that have almost constant spectral response across different locations on the sample.

Therefore, in various aspects of the disclosure, techniques are provided to extend the coupled spot size, thereby effectively increasing the field of view of the spectrometer 104. Some embodiments and techniques enable a larger spectrometer field of view to be achieved by simultaneously coupling light from different locations (spots) on the sample. In examples in which the sample is inhomogeneous over a large area, coupling the spot from different locations at the same time may decrease the sample measurement time.

Figure 2:
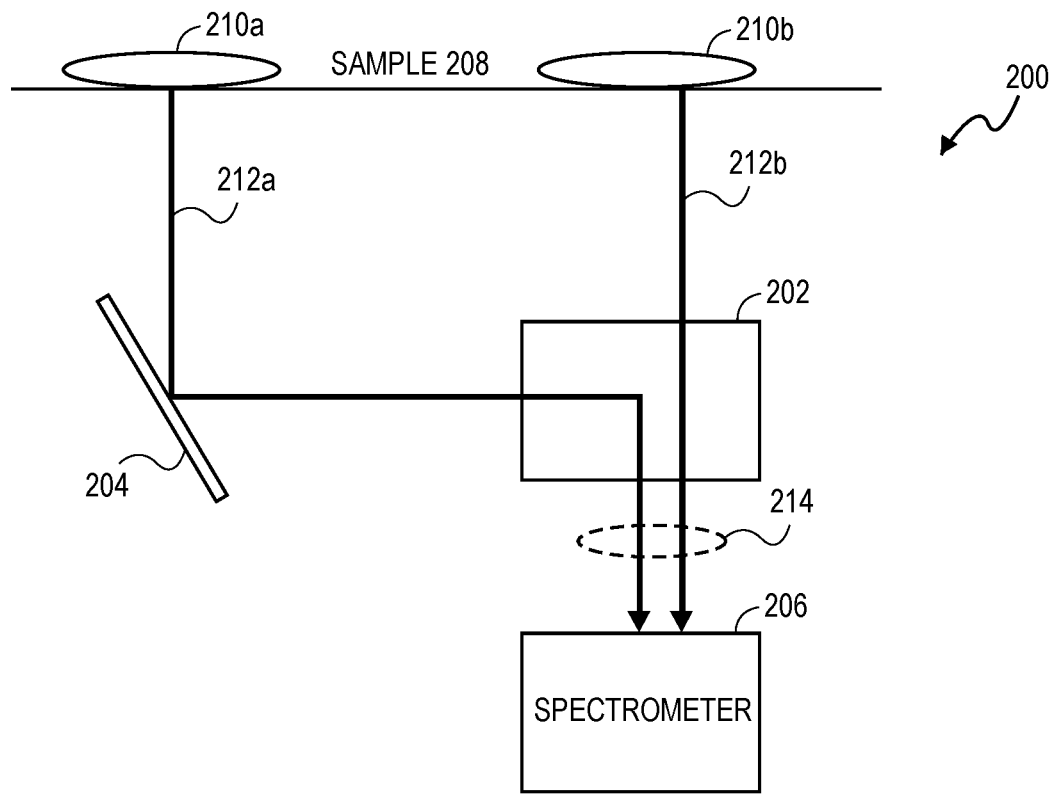
FIG. 2 is a diagram illustrating an example of an optical device configured to optically couple light from multiple spots on a sample to a spectrometer according to some aspects.

Examples of various optical device configurations for optically coupling light from multiple, different spots on a sample into a spectrometer are discussed herein. For example, FIG. 2 illustrates one example of an optical device 200 configured to optically couple light from multiple spots 210a and 210b on a sample 208 to a spectrometer 206 according to some aspects.

The optical device 200 includes a beam combiner 202 and a reflector 204. The reflector 204 is optically coupled to reflect a first light beam 212a from a first spot 210a on the sample 208 towards the beam combiner 202. As used herein, the term optically coupled refers to a position of an optical component in the light path of the optical device 200 that enables the optical component to direct light along the light path towards the spectrometer 206.

In some examples, the reflector 204 may include a forty-five degree mirror. The mirror may be a flat mirror or a curved mirror. In some examples, the beam combiner 202 may include two flat mirrors perpendicular to one another. For example, the beam combiner 202 may be prism-shaped, pyramid-shaped, or cone-shaped. The beam combiner 202 may further include a beam splitter/combiner configured to split the illuminated (input) light and combine the collected light from the multiple spots 210a and 210b. Other configurations of beam combiners 202 may also be utilized, and the present disclosure is not limited to any particular beam combiner configuration.

The beam combiner 202 is optically coupled to receive the first light beam 212a from the first reflector 204 and a second light beam 212b from a second spot 210b on the sample 208. The spots 210a and 210b may be non-overlapping, as shown in FIG. 2, or partially overlapping. In either spot configuration (non-overlapping or partially overlapping), the first spot 210a and the second spot 210b are considered different from one another in that each spot 210a and 210b is positioned at a different respective location on the sample 208, and as such, covers a different respective area of the sample 208. In some examples, each of the first light beam 212a and the second light beam 212b are reflected from (e.g., scattered from) the surface of the surface of the sample 208. However, the disclosure is not limited to diffuse reflectance spectroscopy, and may be applied in the same manner to transmission spectroscopy. For example, with transmission spectroscopy, the light beams 212a and 212b may be transmitted beams that pass through the sample 208 at spots 210a and 210b.

The beam combiner 202 is further configured to combine the first light beam 212a and the second light beam 212b to produce a combined light beam 214. The combined light beam 214 may then be optically coupled from the beam combiner 202 to an input (e.g., an input aperture 106, as shown in FIG. 1) of the spectrometer 206. The spectrometer 206 may be configured to obtain a spectrum of an extended spot area (e.g., an extended spot size) on the sample 208 based on the combined light beam 214. For example, the extended spot area may include the first spot 210a and the second spot 210b. Thus, the extended spot area includes a combined spot area of the first spot 210a and the second spot 210b.

As described above, the spectrometer 206 may include an FTIR spectrometer configured to produce an interferogram that may be detected by a detector. The output of the detector may be processed to obtain the spectrum of the detected light, which may then be utilized to identify various parameters associated with the sample 208. In some examples, the spectrometer 206 may include an interferometer (e.g., a Michelson and/or Fabry-Perot interferometer), which may be implemented, for example, as a micro-electro-mechanical-systems (MEMS) spectrometer. As used herein, the term MEMS refers to the integration of mechanical elements, sensors, actuators and electronics on a common substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. One example of a MEMS element is a micro-optical component having a dielectric or metallized surface working in a reflection or refraction mode. Other examples of MEMS elements include actuators, detector grooves, and fiber grooves. In some examples, a MEMS spectrometer may include one or more micro-optical components (e.g., one or more reflectors or mirrors) that may be movably controlled by a MEMS actuator. For example, the MEMS spectrometer may be fabricated using a deep reactive ion etching (DRIE) process on a silicon-on-insulator (SOI) substrate in order to produce the micro-optical components and other MEMS elements that are able to process free-space optical beams propagating parallel to the SOI substrate.

Figure 3:
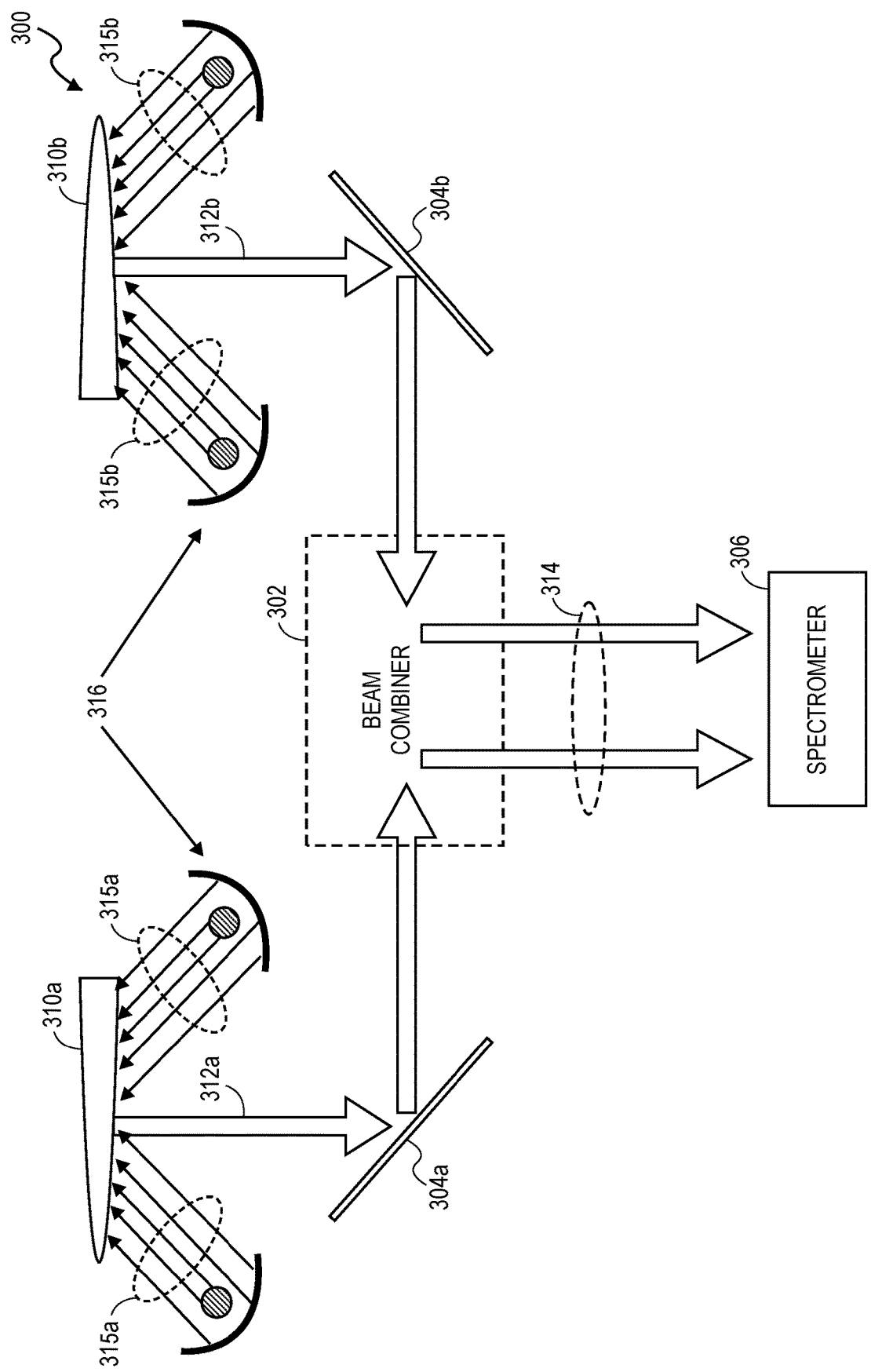
FIG. 3 is a diagram illustrating another example of an optical device configured to optically couple light from multiple spots on a sample to a spectrometer according to some aspects.

FIG. 3 is a diagram illustrating another example of an optical device 300 configured to optically couple light from multiple spots 310a and 310b on a sample to a spectrometer 306 according to some aspects. In the example shown in FIG. 3, the optical device 300 includes a beam combiner 302 and two reflectors 304a and 304b.

In addition, the optical device 300 includes a plurality of light sources 316, configured to generate the light incident on the spots 310a and 310b in a diffuse reflectance spectroscopy mode. In the example shown in FIG. 3, there are four light sources 316, two of which are positioned to generate and direct a first input light beam 315a towards spot 310a, whereas the other two are positioned to generate and direct a second input light beam 315b towards spot 310b. The corresponding input light beams 315a and 315b may be reflected (e.g., scattered) from each of the spots 310a and 310b.

It should be understood that the present disclosure is not limited to any particular number or configuration of the light sources 316. For example, the position and number of light sources 316 may vary, based on the configuration of the optical device 300. In an example, instead of using two light sources to generate each of the input light beams 315a and 315b, a first single light source may be utilized to generate the first input light beam 315a and a second single light source may be utilized to generate the second input light beam 315b. In another example, a single light source may be utilized to generate both of the input light beams 315a and 315b. In other examples, the light sources 316 may be external to the optical device 300 (e.g., on an opposite side of the sample) to couple light from the spots 310a and 310b to the spectrometer 306 in a transmission spectroscopy mode.

A first reflector 304a is optically coupled to reflect a first light beam 312a from a first spot 310a on the sample towards the beam combiner 302. A second reflector 304b is optically coupled to reflect a second light beam 312b from a second spot 310b on the sample (different from the first spot 310a) towards the beam combiner 302. The spots 310a and 310b may each correspond to a different location on the sample and may be non-overlapping (as shown in FIG. 3) or partially overlapping. In some examples, the reflectors 304a and 304b may include forty-five degree mirrors. The mirrors may be flat mirrors or curved mirrors. In some examples, the beam combiner 302 may include two flat mirrors perpendicular to one another. For example, the beam combiner 302 may be prism-shaped, pyramid-shaped, cone-shaped, or may be a curved mirror. The beam combiner 302 may further include a beam splitter/combiner configured to combine the collected light from the multiple spots 310a and 310b. Other configurations of beam combiners 302 may also be utilized, and the present disclosure is not limited to any particular beam combiner configuration.

The beam combiner 302 is optically coupled to receive the first light beam 312a from the first reflector 304a and the second light beam 312b from the second reflector 304b. The beam combiner 302 is further configured to combine the first light beam 312a and the second light beam 312b to produce a combined light beam 314. The combined light beam 314 may then be optically coupled from the beam combiner 302 to an input (e.g., an input aperture 106, as shown in FIG. 1) of the spectrometer 306. The spectrometer 306 may be configured to obtain a spectrum of an extended spot area (e.g., an extended spot size) on the sample based on the combined light beam 314. For example, the extended spot area may include the first spot 310a and the second spot 310b. Thus, the extended spot area includes a combined spot area of the first spot 310a and the second spot 310b. For example, the extended spot area may include a summation of the collected light coming from each branch (e.g., spot 310a/reflector 304a/beam combiner 302 and spot 310b/reflector 304b/beam combiner 302).

Figure 4:
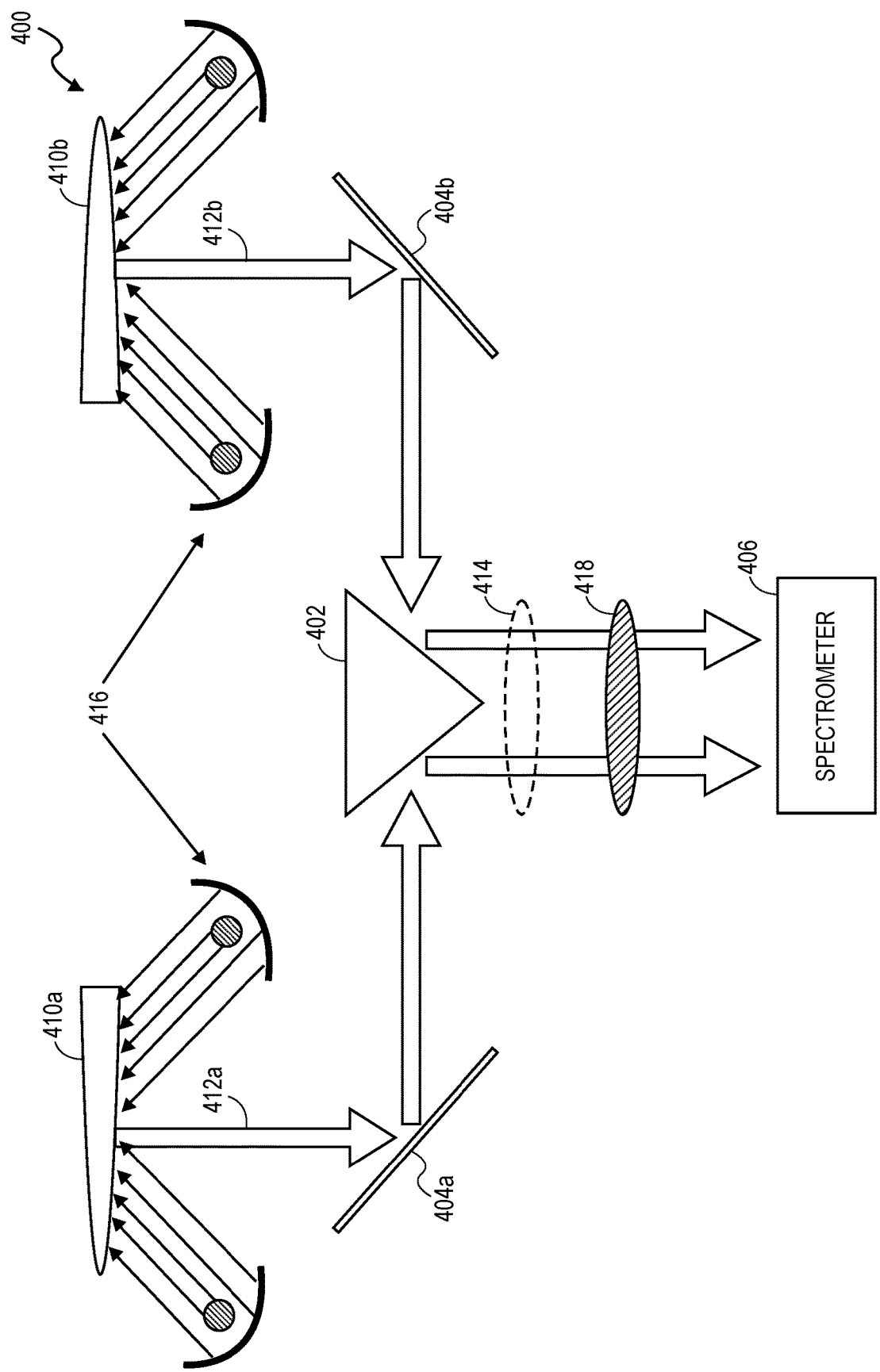
FIG. 4 is a diagram illustrating another example of an optical device configured to optically couple light from multiple spots on a sample to a spectrometer according to some aspects.

FIG. 4 is a diagram illustrating another example of an optical device 400 configured to optically couple light from multiple spots 410a and 410b on a sample to a spectrometer 406 according to some aspects. The spots 410a and 410b may each correspond to a different location on the sample and may be non-overlapping (as shown in FIG. 4) or partially overlapping. In the example shown in FIG. 4, the optical device 400 includes a beam combiner 402, two reflectors 404a and 404b, and a lens 418. In addition, the optical device 400 may include one or more light sources 416 (e.g., four of which are shown in FIG. 4), as described above in connection with FIG. 3.

A first reflector 404a is optically coupled to reflect a first light beam 412a from a first spot 410a on the sample towards the beam combiner 402. A second reflector 404b is optically coupled to reflect a second light beam 412b from a second spot 410b on the sample (different from the first spot 410a) towards the beam combiner 402. The beam combiner 402 is optically coupled to combine the first light beam 412a and the second light beam 412b to produce a combined light beam 414. In the example shown in FIG. 4, the reflectors 404a and 404b are forty-five degree flat mirrors. In addition, the beam combiner 402 is a prism-shaped beam combiner.

The lens 418 is optically coupled between the beam combiner 402 and the spectrometer 406. Adding the lens 418 to the light path can enhance the coupling of light into the spectrometer 406 by focusing the combined light beam 414 into the input aperture of the spectrometer. The lens 418 may be, for example, a convex lens, concave lens, aspheric lens, or freeform lens. Lenses may be added in other parts of the light path for collimation or other transformation of the light beams to further enhance the coupling of light into the spectrometer 406.

Figure 5:
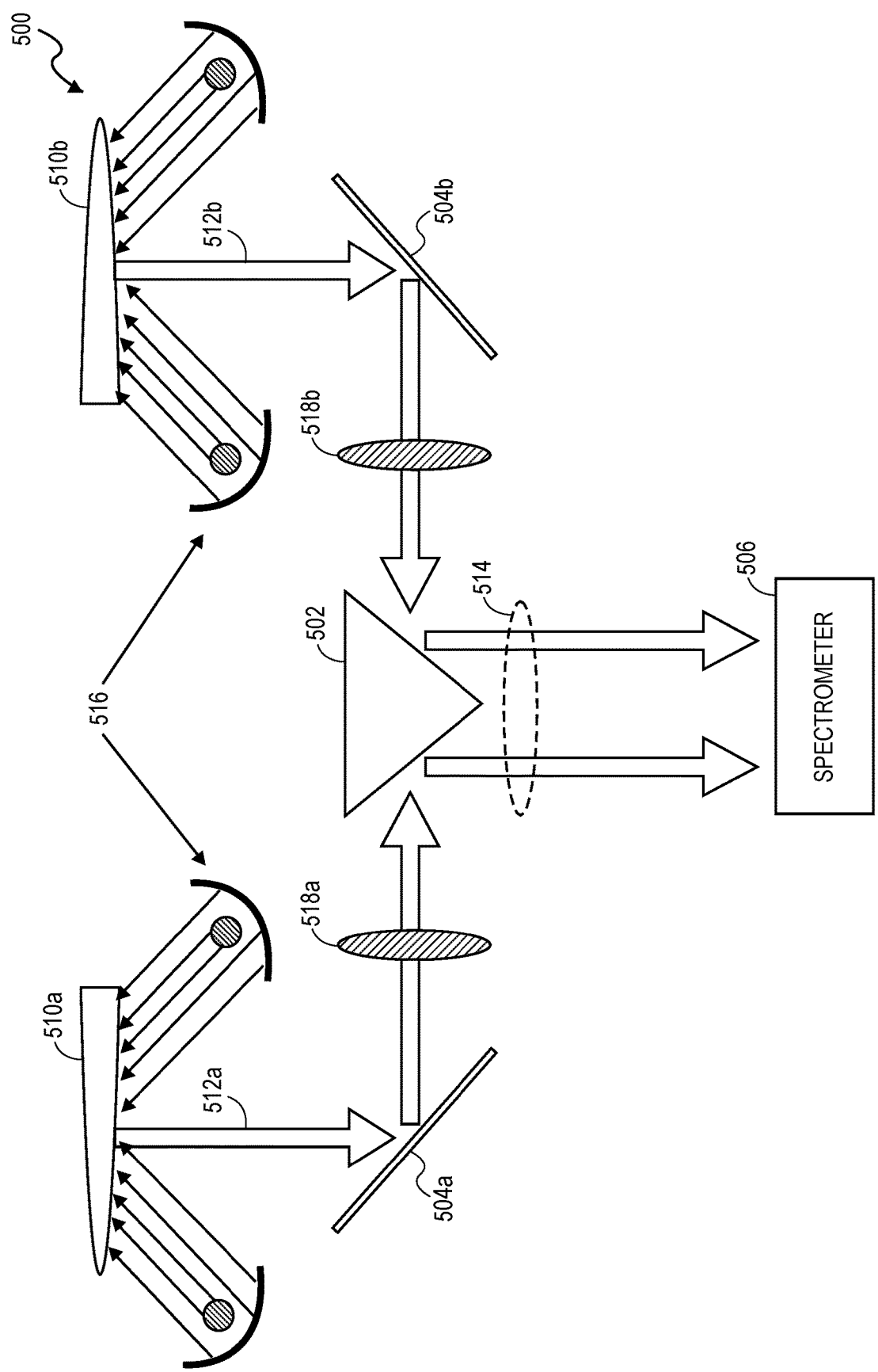
FIG. 5 is a diagram illustrating another example of an optical device configured to optically couple light from multiple spots on a sample to a spectrometer according to some aspects.

FIG. 5 is a diagram illustrating another example of an optical device 500 configured to optically couple light from multiple spots 510a and 510b on a sample to a spectrometer 506 according to some aspects. The spots 510a and 510b may each correspond to a different location on the sample and may be non-overlapping (as shown in FIG. 5) or partially overlapping. In the example shown in FIG. 5, the optical device 500 includes a beam combiner 502, two reflectors 504a and 504b, and two lenses 518a and 518b. In addition, the optical device 500 may include one or more light sources 516 (e.g., four of which are shown in FIG. 5), as described above in connection with FIG. 3.

A first reflector 504a is optically coupled to reflect a first light beam 512a from a first spot 510a on the sample towards the beam combiner 502. A second reflector 504b is optically coupled to reflect a second light beam 512b from a second spot 510b on the sample (different from the first spot 510a) towards the beam combiner 502. The lenses 518a and 518b are optically coupled between the reflectors 504a and 504b and the beam combiner 502 to focus or otherwise transform the light beams 512a and 512b input to the beam combine 502. For example, the lenses 518a and 518b may transform the angle of the light rays in the beams 512a and 512b coming from the edges of the spots 510a and 510b to be within the spectrometer acceptance angle. The lenses 518a and 518b may be, for example, convex lenses, concave lenses, aspheric lenses, or freeform lenses.

The beam combiner 502 is optically coupled to combine the first light beam 512a and the second light beam 512b to produce a combined light beam 514 that is directed to an input (e.g., input aperture 106, shown in FIG. 1) of the spectrometer 506. In the example shown in FIG. 5, the reflectors 504a and 504b are forty-five degree flat mirrors. In addition, the beam combiner 502 is a prism-shaped beam combiner.

Figure 6:
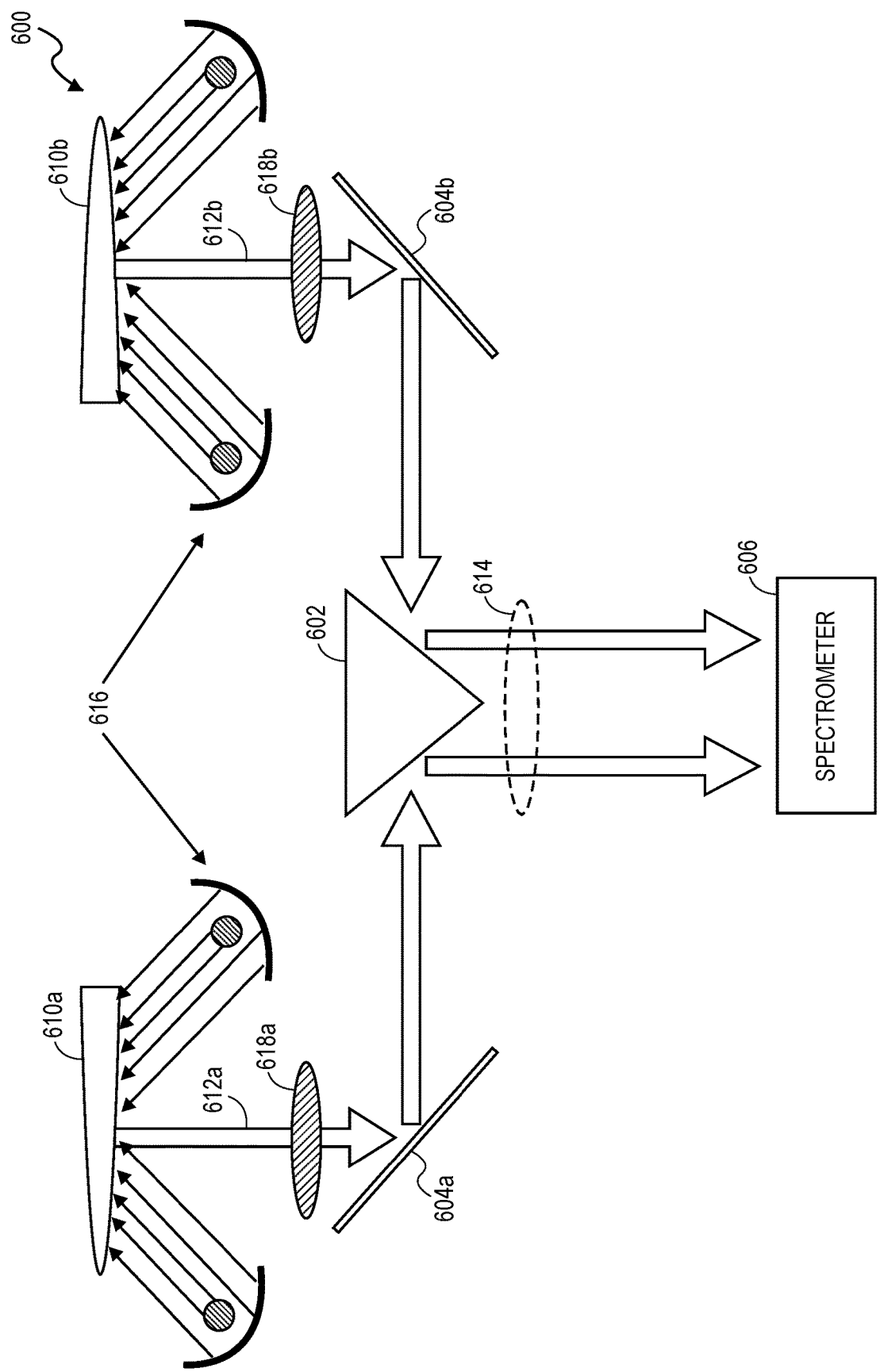
FIG. 6 is a diagram illustrating another example of an optical device configured to optically couple light from multiple spots on a sample to a spectrometer according to some aspects.

FIG. 6 is a diagram illustrating another example of an optical device 600 configured to optically couple light from multiple spots 610a and 610b on a sample to a spectrometer 606 according to some aspects. The spots 610a and 610b may each correspond to a different location on the sample and may be non-overlapping (as shown in FIG. 6) or partially overlapping. In the example shown in FIG. 6, the optical device 600 includes a beam combiner 602, two reflectors 604a and 604b, and two lenses 618a and 618b. The lenses 618a and 618b may be, for example, convex lenses, concave lenses, aspheric lenses, or freeform lenses. In addition, the optical device 600 may include one or more light sources 616 (e.g., four of which are shown in FIG. 6), as described above in connection with FIG. 3.

A first lens 618a is optically coupled between a first spot 610a on the sample and a first reflector 604a to focus or otherwise transform a first light beam 612a reflected from the first spot 610a. The first reflector 604a is further optically coupled to reflect the first light beam 612a towards the beam combiner 602. A second lens 618b is optically coupled between a second spot 610b on the sample and a second reflector 604b to focus or otherwise transform a second light beam 612b reflected from the second spot 610b. The second reflector 604b is further optically coupled to reflect the second light beam 612b towards the beam combiner 602.

The beam combiner 602 is optically coupled to combine the first light beam 612a and the second light beam 612b to produce a combined light beam 614 that is directed to an input (e.g., input aperture 106, shown in FIG. 1) of the spectrometer 606. In the example shown in FIG. 6, the reflectors 604a and 604b are forty-five degree flat mirrors. In addition, the beam combiner 602 is a prism-shaped beam combiner.

Figure 7:
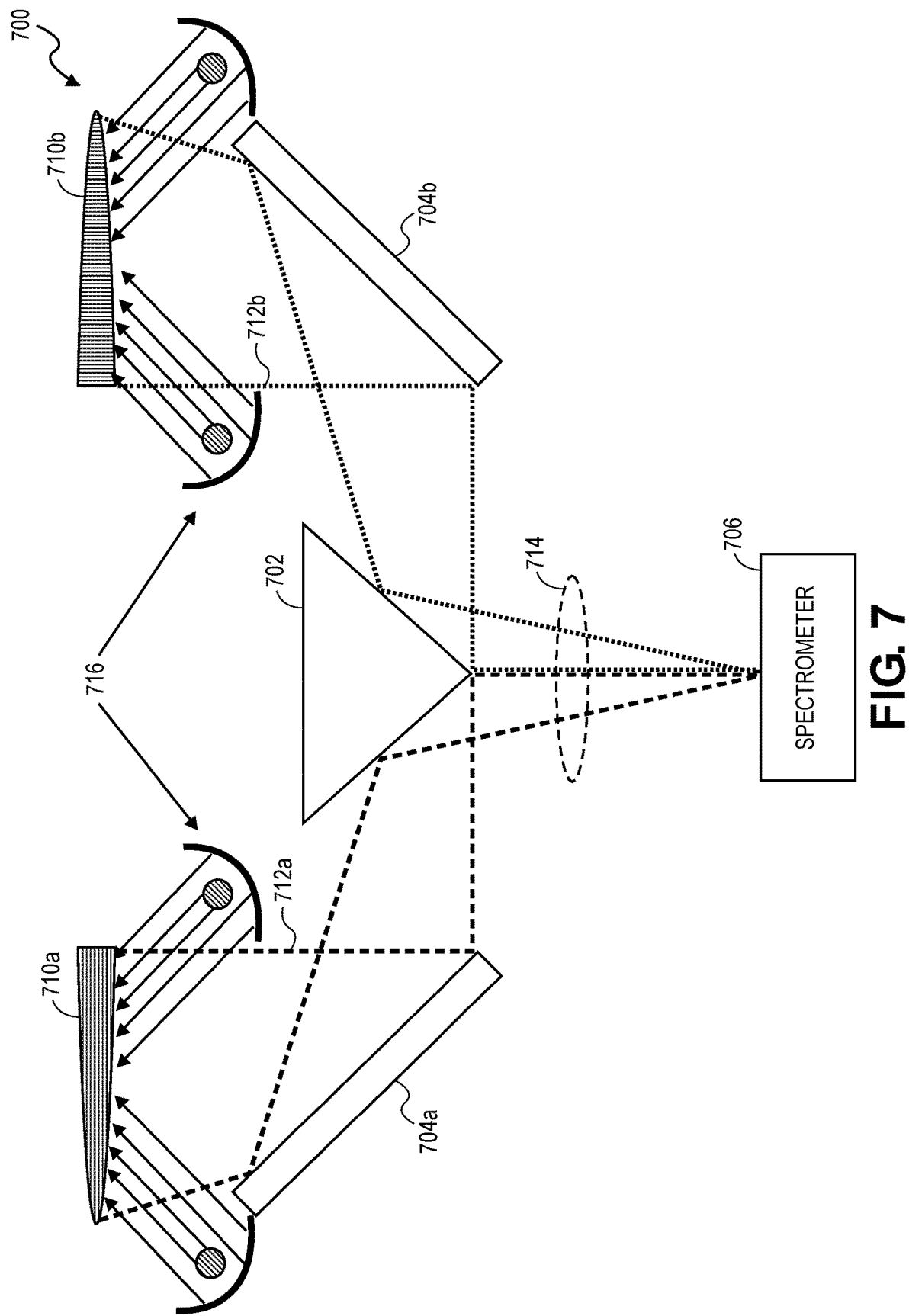
FIG. 7 is a diagram illustrating another example of an optical device configured to optically couple light from multiple spots on a sample to a spectrometer according to some aspects.

FIG. 7 is a diagram illustrating another example of an optical device 700 configured to optically couple light from multiple spots 710a and 710b on a sample to a spectrometer 706 according to some aspects. The optical device 700 includes flat mirrors 704a and 704b, a beam combiner 702, and one or more light sources 716 (e.g., four of which are shown in FIG. 7).

In FIG. 7, an exemplary ray tracing of light rays reflected from the spots 710a and 710b is illustrated. For example, a first light beam 712a including a plurality of light rays (the edges of which are shown) reflected from a first spot 710a on the sample is received by a first flat mirror 704a and reflected towards the beam combiner 702. A second light beam 712b including a plurality of light rays (the edges of which are shown) reflected from a second spot 710b on the sample is received by a second flat mirror 704b and reflected towards the beam combiner 702. The beam combiner 702 is optically coupled to combine the first light beam 712a and the second light beam 712b to produce a combined light beam 714 that is directed towards the spectrometer 706.

Figure 8:
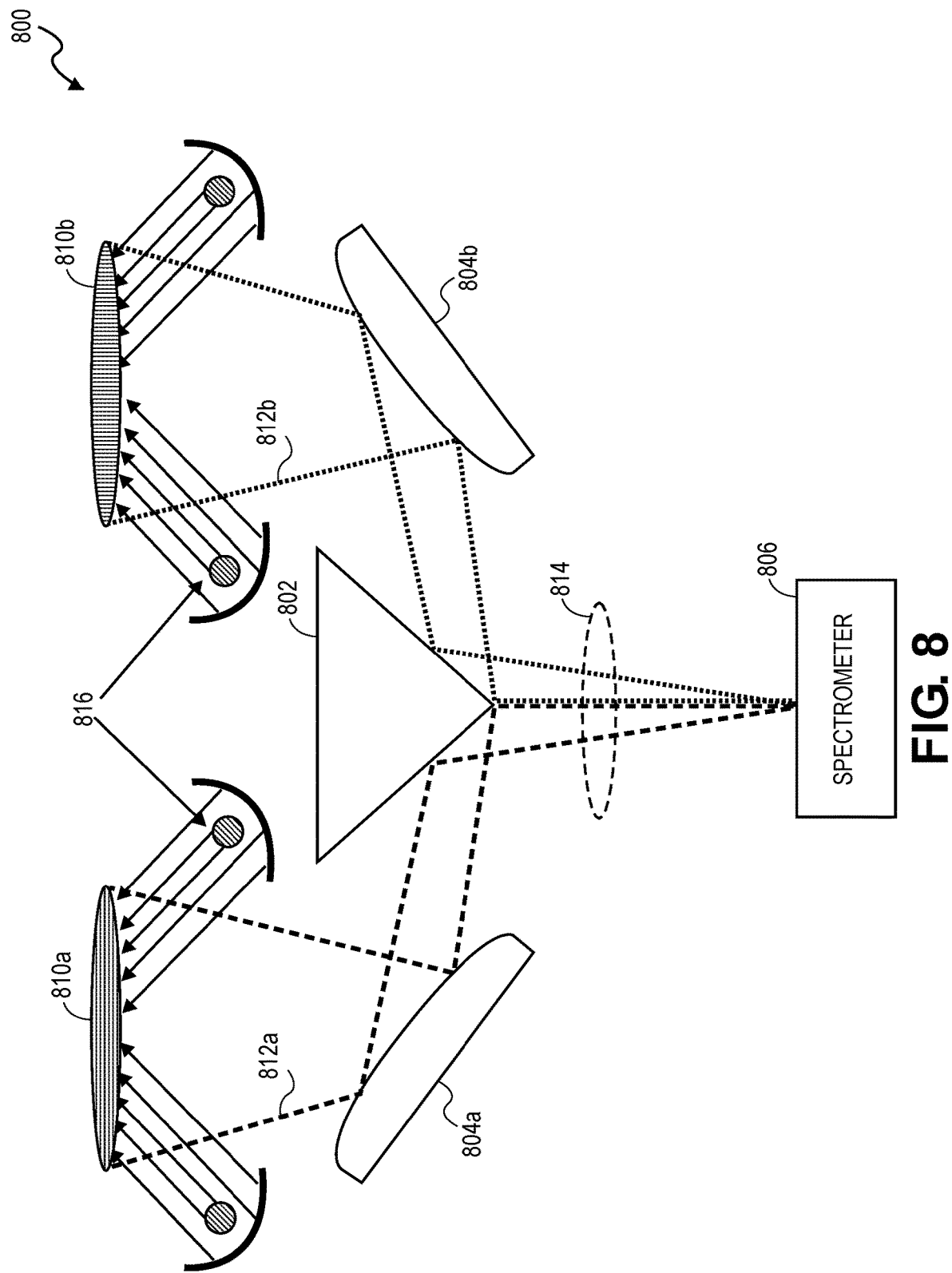
FIG. 8 is a diagram illustrating another example of an optical device configured to optically couple light from multiple spots on a sample to a spectrometer according to some aspects.

To enhance the light coupling, curved mirrors may be used instead of flat mirrors. FIG. 8 is a diagram illustrating another example of an optical device 800 configured to optically couple light from multiple spots 810a and 810b on a sample to a spectrometer 806 according to some aspects. The optical device 800 includes curved mirrors 804a and 804b, a beam combiner 802, and one or more light sources 816 (e.g., four of which are shown in FIG. 8). The curvature of the curved mirrors 804a and 804b may be, for example, parabolic, spherical, elliptical, or any standard conical section, or may also be free-form in shape to arbitrarily adjust the coupling from the spots 810a and 810b.

In FIG. 8, an exemplary ray tracing of light rays reflected from the spots 810a and 810b is illustrated. In comparison to the example shown in FIG. 7, the use of curved mirrors 804a and 804b (as opposed to flat mirrors 704a and 704b) can enhance the coupling of the light rays coming from the edges of the sample spots 810a and 810b to the spectrometer 806 to ensure the sample edge light rays are within the acceptance angle of the spectrometer 806.

Figure 9:
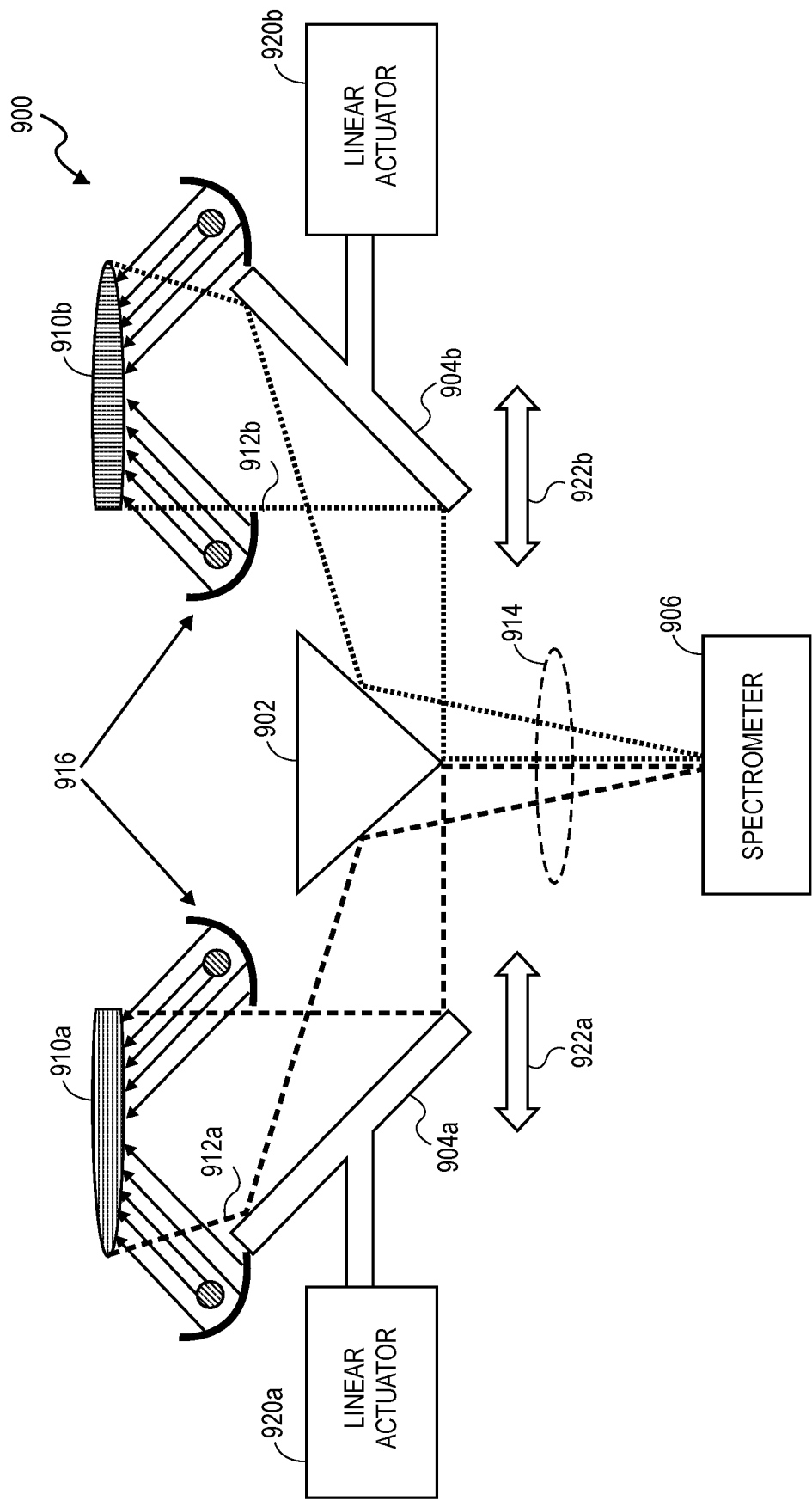
FIG. 9 is a diagram illustrating another example of an optical device configured to optically couple light from multiple spots on a sample to a spectrometer according to some aspects.

FIG. 9 is a diagram illustrating another example of an optical device 900 configured to optically couple light from multiple spots 910a and 910b on a sample to a spectrometer 906 according to some aspects. The spots 910a and 910b may each correspond to a different location on the sample and may be non-overlapping (as shown in FIG. 9) or partially overlapping. In the example shown in FIG. 9, the optical device 900 includes a beam combiner 902, two reflectors 904a and 904b, and one or more light sources 916 (e.g., four of which are shown in FIG. 9).

A first reflector 904a is optically coupled to reflect a first light beam 912a from a first spot 910a on the sample towards the beam combiner 902. A second reflector 904b is optically coupled to reflect a second light beam 912b from a second spot 910b on the sample (different from the first spot 910a) towards the beam combiner 902. The beam combiner 902 is optically coupled to combine the first light beam 912a and the second light beam 912b to produce a combined light beam 914 that is directed towards an input of the spectrometer 906.

As described above, the extended spot area collected by the spectrometer 906 corresponds to the summation of the collected light from both branches (e.g., a first branch including spot 910a/reflector 904a/beam combiner 902 and a second branch including spot 910b/reflector 904b/beam combiner 902). The individual spot area of each branch (e.g., the spot size of each spot 910a and 910b) may be limited by the total optical path length between the sample interface and the spectrometer input/acceptance angle. In addition, the separation between the two spot areas can be controlled by the distance between the reflectors 904a and 904b and the beam combiner 902.

To increase the individual spot areas of each spot 910a and 910b, and thus increase the extended spot area collected by the spectrometer 906, the separation between the two spots 910a and 910b can be adjusted. In the example shown in FIG. 9, linear actuators 920a and 920b are shown coupled to the reflectors 904a and 904b to move the reflectors 904a and 904b and cause a respective displacement 922a and 922b thereof. By moving the reflectors 904a and 904b back and forth, the optical device 900 can scan the sample at different respective spots, thus producing a larger extended spot area and further increasing the field of view of the spectrometer 906.

Figure 10:
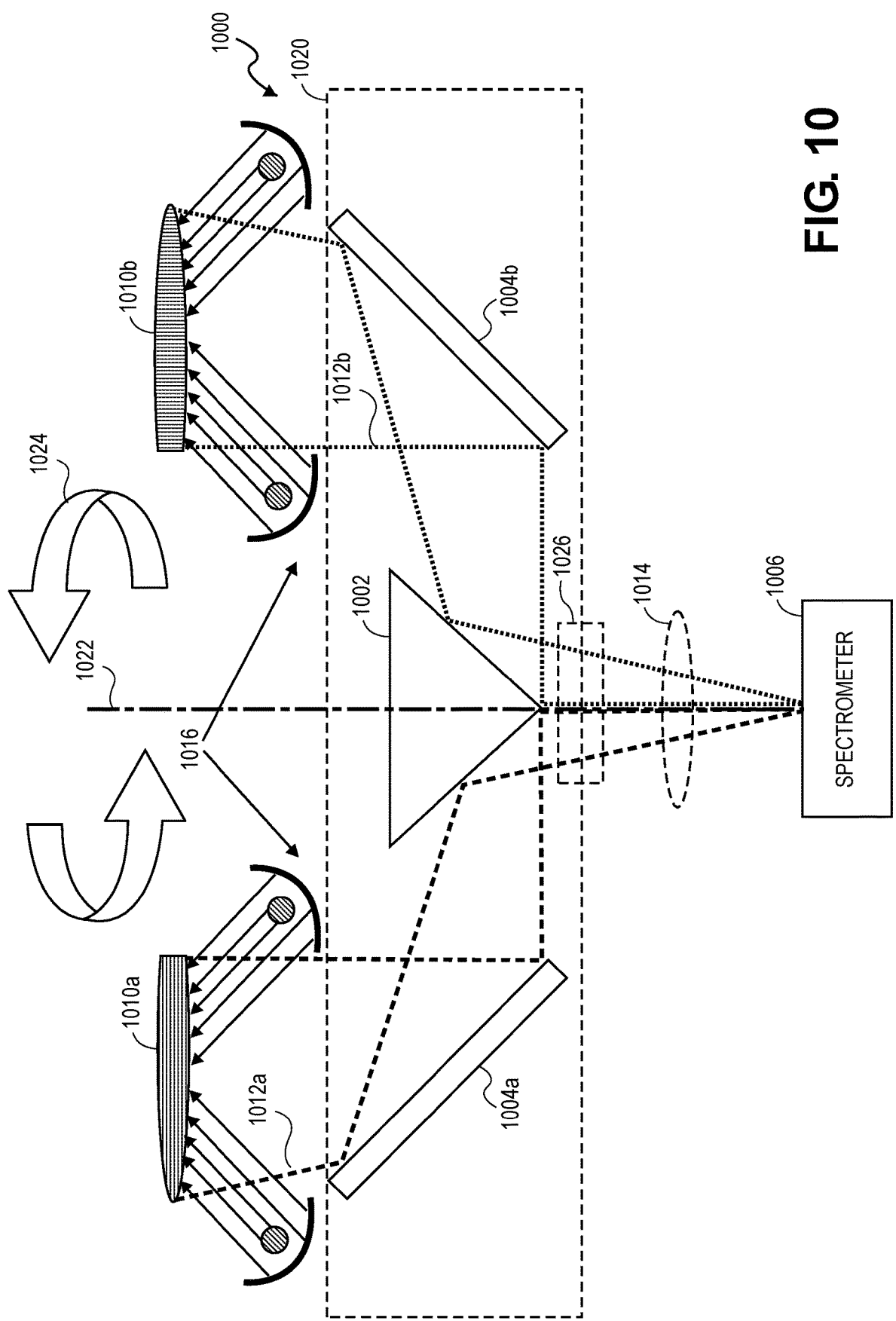
FIG. 10 is a diagram illustrating another example of an optical device configured to optically couple light from multiple spots on a sample to a spectrometer according to some aspects.

FIG. 10 is a diagram illustrating another example of an optical device 1000 configured to optically couple light from multiple spots 1010a and 1010b on a sample to a spectrometer 1006 according to some aspects. The spots 1010a and 1010b may each correspond to a different location on the sample and may be non-overlapping (as shown in FIG. 10) or partially overlapping. In the example shown in FIG. 10, the optical device 1000 includes a beam combiner 1002, two reflectors 1004a and 1004b, and one or more light sources 1016 (e.g., four of which are shown in FIG. 10).

A first reflector 1004a is optically coupled to reflect a first light beam 1012a from a first spot 1010a on the sample towards the beam combiner 402. A second reflector 1004b is optically coupled to reflect a second light beam 1012b from a second spot 1010b on the sample (different from the first spot 1010a) towards the beam combiner 1002. The beam combiner 1002 is optically coupled to combine the first light beam 1012a and the second light beam 1012b to produce a combined light beam 1014 that is directed towards an input of the spectrometer 1006.

To increase the extended spot area collected by the spectrometer 1006, a rotating device 1026 can be used to rotate 1024 an apparatus 1020 including at least the beam combiner 1002 and reflectors 1004a and 1004b around a central axis 1022 thereof, while the spectrometer 1006 remains fixed in location. The rotating device 1026 may include, for example, a motor and rotating plate to which the apparatus 1020 is attached. By rotating the apparatus 1020, the spot location on the sample changes, thus resulting in improved sample representation especially for non-homogeneous samples, such as grains. In this example, rotation of the apparatus 1020 may generate a scanned area on the sample corresponding to the extended spot area. The scanned area may include, for example, a ring having a diameter controlled by the spacing between the first reflector 1004a and the second reflector 1004b.

Figure 11:
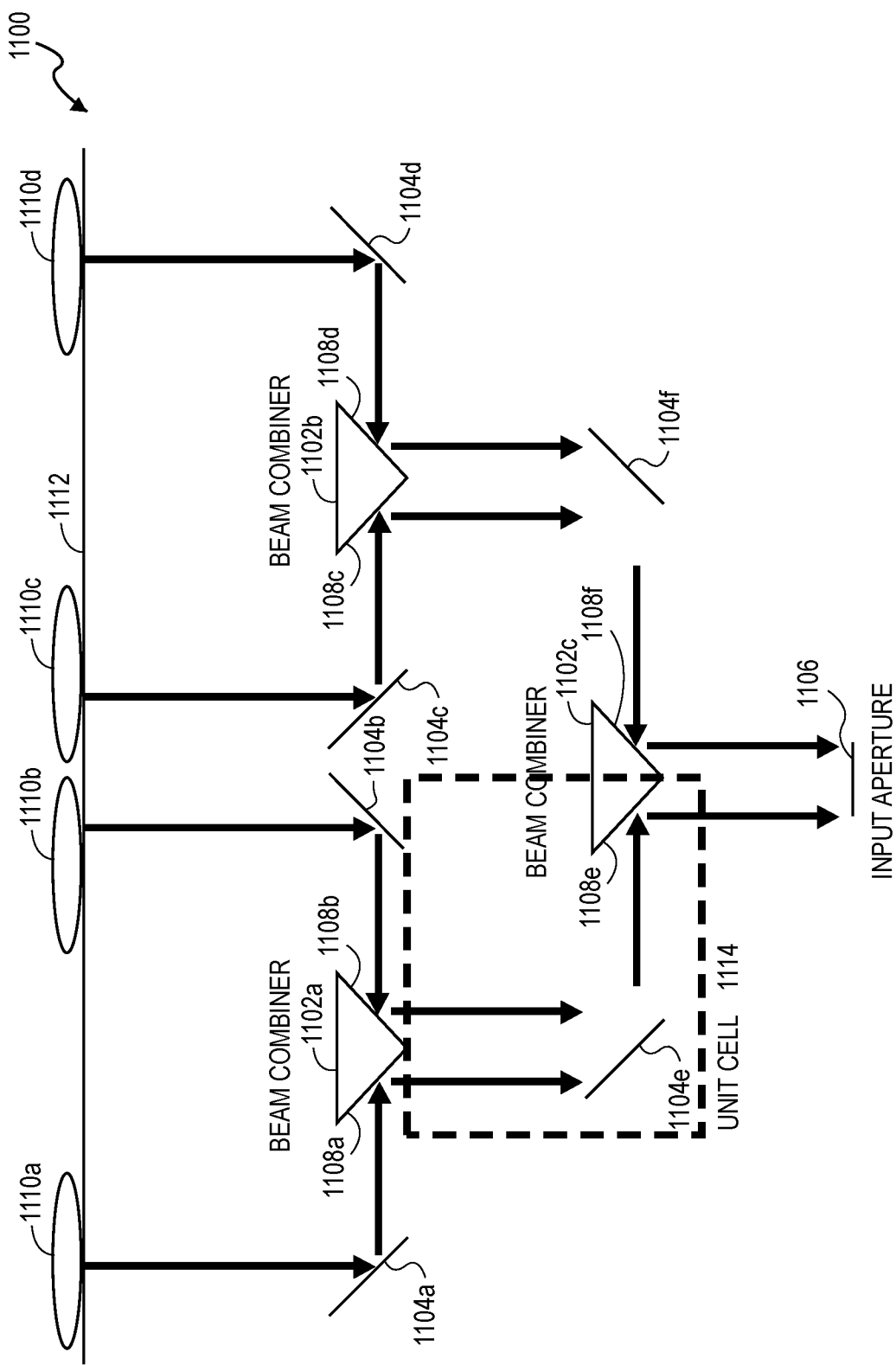
FIG. 11 is a diagram illustrating another example of an optical device configured to optically couple light from multiple spots on a sample to a spectrometer according to some aspects.

FIG. 11 is a diagram illustrating another example of an optical device 1100 configured to optically couple light from multiple spots 1110a-1110d on a sample to an input aperture of a spectrometer 1106 according to some aspects. In the example shown in FIG. 11, the optical device 1100 includes a plurality of beam combiners 1102a-1102c and a plurality of reflectors 1104a-1104f that may be formed into a tree structure using unit cells 1114. The tree structure can enable the light from multiple, spatially separated spots 1110a-

1110d to be combined into a single combined light beam that is input to the spectrometer 1106. For example, each of the unit cells 1114 may be configured to couple light from at least one of the spots 1110a-1110d on the sample towards the beam combiner 1102.

In the example shown in FIG. 11, each beam combiner 1102a-1102c includes two perpendicular flat mirrors. For example, beam combiner 1102a includes flat mirrors 1108a and 1108b, beam combiner 1102b includes flat mirrors 1108c and 1008d, and beam combiner 1102c includes flat mirrors 1108e and 1108f. A unit cell 1114 may be formed of one of the flat mirrors (e.g., mirror 1108e) of a beam combiner (e.g., beam combiner 1102c) and one of the reflectors (e.g., reflector 1104e) optically coupled to reflect a light beam towards the flat mirror 1108e of the unit cell 1114. Thus, the unit cell 1114 includes two forty-five degree mirrors facing each other. Other unit cells may be similarly configured. For example, flat mirror 1108a and reflector 1104a may form one unit cell, flat mirror 1108b and reflector 1104b may form another unit cell, flat mirror 1108c and reflector 1104c may form another unit cell, flat mirror 1108d and reflector 1104d may form another unit cell, and flat mirror 1108f and reflector 1104f may form another unit cell. The unit cells 1114 themselves may be further optimized to achieve the desired coupling. For example, the optimization may include the use of lenses or different curvatures of the reflectors.

The unit cells 1114 may be the basic building blocks of the optical device 1100. For example, each unit cell 1114 may be molded as a single piece with a mechanical interface and then the unit cells 1114 may be assembled together based on the target extended spot area. The manufacturing of an optical device 1100 based on unit cells 1114 may reduce the overall cost as compared to manufacturing a complete system, and thus may provide an attractive solution for volume production.

Figure 12:
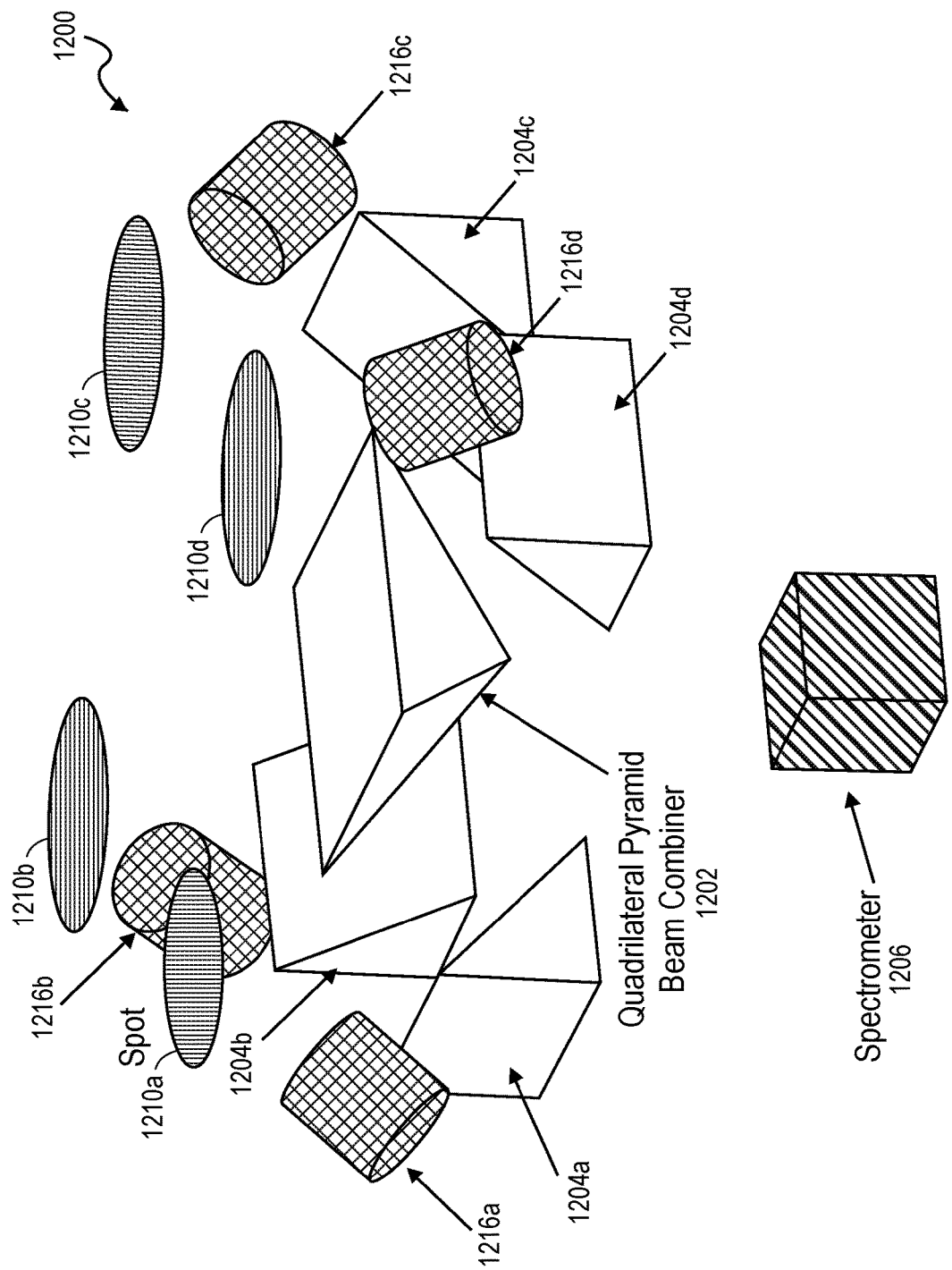
FIG. 12 is a diagram illustrating another example of an optical device configured to optically couple light from multiple spots on a sample to a spectrometer according to some aspects.

FIG. 12 is a diagram illustrating another example of an optical device 1200 configured to optically couple light from multiple spots 1210a-1210d on a sample to a spectrometer 1206 according to some aspects. In the example shown in FIG. 12, the optical device 1200 includes a beam combiner 1202, multiple reflectors 1204a-1204d, and multiple light sources 1216a-1216d.

Each light source 1216a-1216d is optically coupled to direct a respective input light beam towards a respective spot 1210a-1210d on the sample. Each reflector 1204a-1204d is further optically coupled to receive a respective light beam reflected from (e.g., scattered from) each spot 1210a-1210d on the sample and to reflect the respective light beam towards the beam combiner 1202. In the example shown in FIG. 12, the beam combiner 1202 is a quadrilateral pyramid beam combiner 1202, optically coupled to receive the respective light beams reflected from the respective reflector 1204a-1204d and to combine the respective light beams to produce a combined light beam for input to the spectrometer 1206.

Figure 13:
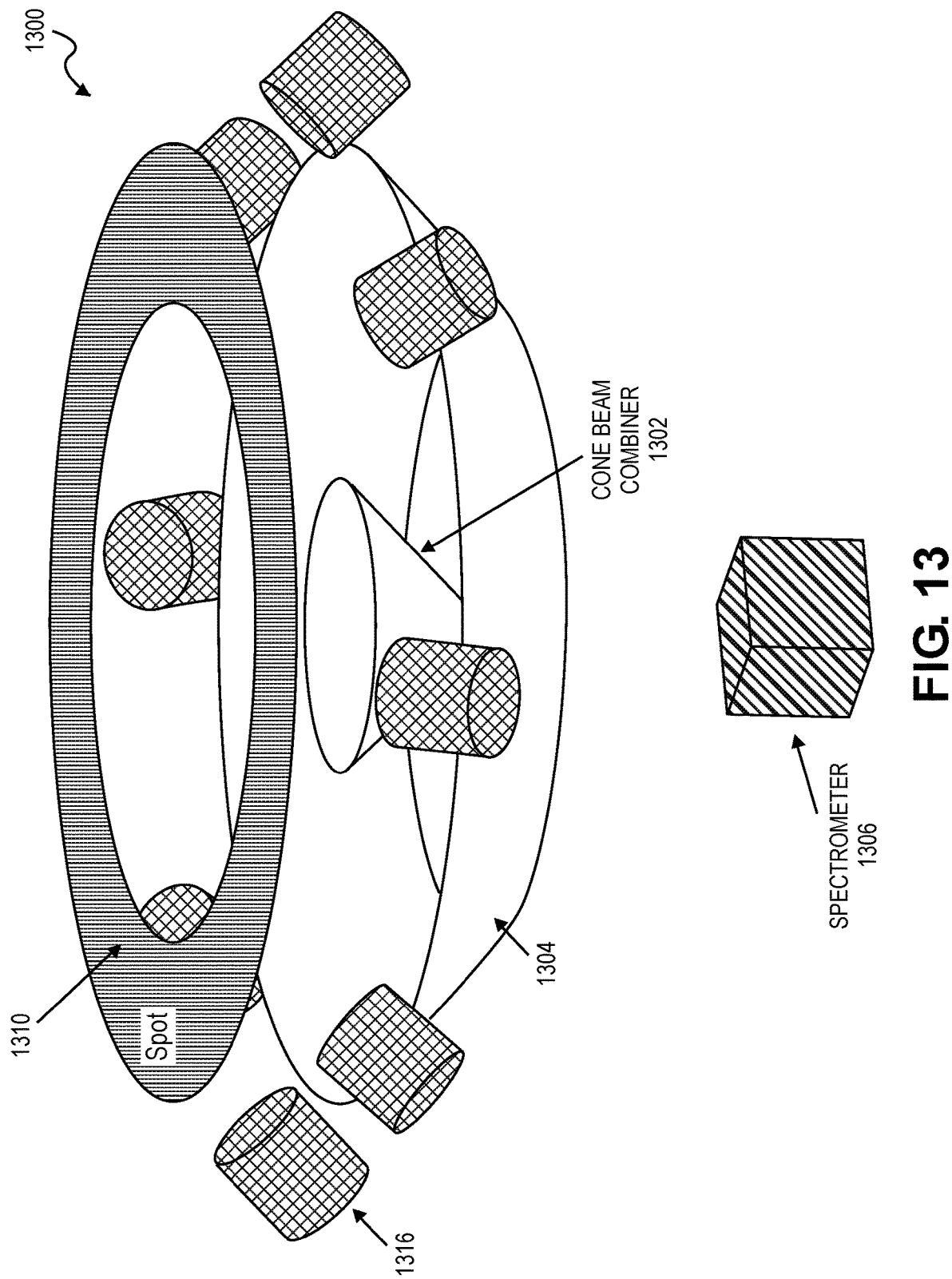
FIG. 13 is a diagram illustrating another example of an optical device configured to optically couple light from multiple spots on a sample to a spectrometer according to some aspects.

FIG. 13 is a diagram illustrating another example of an optical device 1300 configured to optically couple light from multiple spots 1310 on a sample to a spectrometer 1306 according to some aspects. In the example shown in FIG. 13, the optical device 1300 includes a beam combiner 1302, a reflector 1304, and multiple light sources 1316. In the example shown in FIG. 13, the beam combiner 1302 is a cone beam combiner and the reflector 1304 is a circular reflector optically coupled to direct a plurality of light beams from a plurality of spots on the sample towards the cone beam combiner 1302 to produce a combined light beam for input to the spectrometer 1306. As the number of light sources 1316 increases, the plurality of spots may collectively form a single spot 1310 having the shape of a ring, as shown in FIG. 13.

Figure 14:
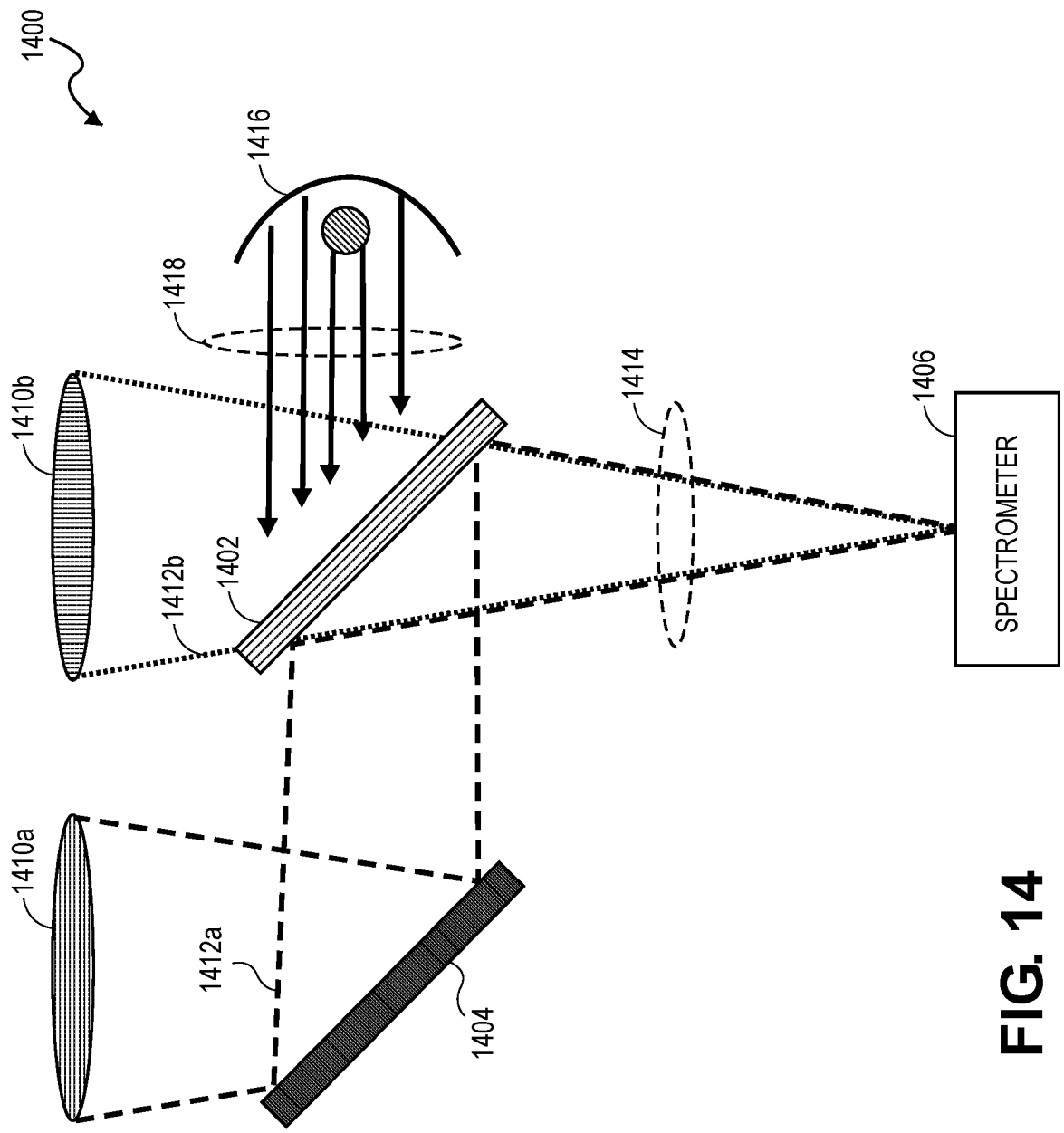
FIG. 14 is a diagram illustrating another example of an optical device configured to optically couple light from multiple spots on a sample to a spectrometer according to some aspects.

FIG. 14 is a diagram illustrating another example of an optical device 1400 configured to optically couple light from multiple spots 1410a and 1410b on a sample to a spectrometer 1406 according to some aspects. The optical device 1400 includes a beam combiner 1402 and a reflector 1404. The beam combiner 1402 shown in FIG. 14 is configured for both beam splitting and beam combining, and as such, may be referred to herein as a beam splitter/combiner. The beam splitter/combiner 1402 can be, for example, a prism-based splitter, a polka dot splitter, a parallel plate splitter, or may have any other suitable beam splitter/combiner configuration.

In the example shown in FIG. 14, the beam splitter/combiner 1402 is optically coupled to receive an input light beam 1418 from a light source 1416. In this example, the light source 1416 is positioned to the side of the sample. The beam splitter/combiner 1402 is configured to split the input light beam 1418 into first and second input light beams. The beam splitter/combiner 1402 is further optically coupled to direct the first input light beam towards the reflector 1404 for reflection of the first input light beam towards a first spot 1410a on the sample and the second input light beam towards a second spot 1410b on the sample. The reflector 1404 is optically coupled to receive a first light beam 1412a reflected from the first spot 1410a and to direct the first light beam 1412a towards the beam splitter/combiner 1402. The beam splitter/combiner 1402 is further optically coupled to receive a second light beam 1412b reflected from the second spot 1410b and to combine the first light beam 1412a and the second light beam 1412b to produce a combined light beam 1414 for input to the spectrometer 1406.

Figure 15:
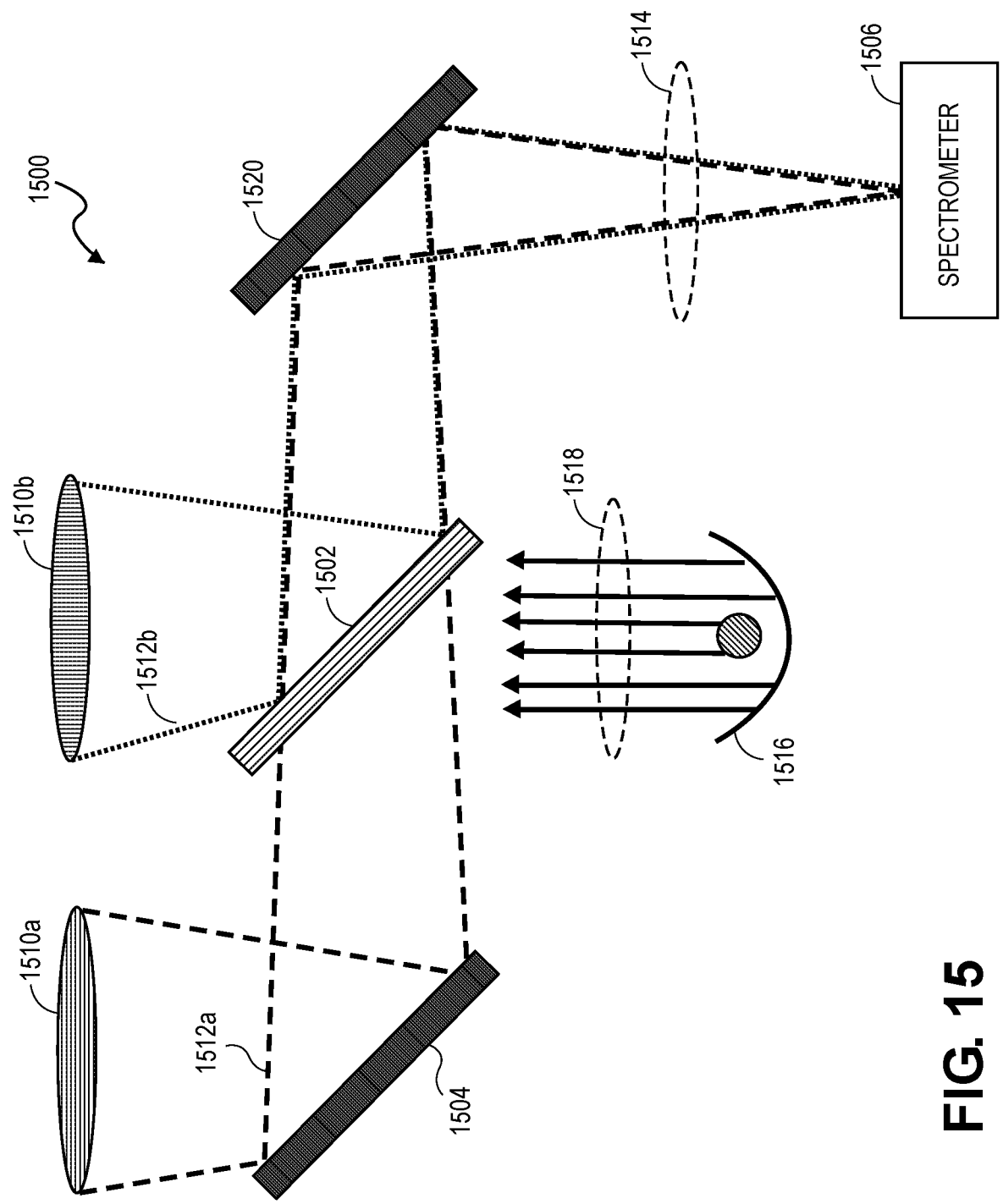
FIG. 15 is a diagram illustrating another example of an optical device configured to optically couple light from multiple spots on a sample to a spectrometer according to some aspects.

FIG. 15 is a diagram illustrating another example of an optical device 1500 configured to optically couple light from multiple spots 1510a and 1510b on a sample to a spectrometer 1506 according to some aspects. The optical device 1500 includes a beam splitter/combiner 1502, a first reflector 1504, and a second reflector 1520. In the example shown in FIG. 15, the beam splitter/combiner 1502 is optically coupled to receive an input light beam 1518 from a light source 1516. In this example, the light source 1516 is positioned below the sample. The beam splitter/combiner 1502 is configured to split the input light beam into first and second input light beams. The beam splitter/combiner 1502 is further optically coupled to direct the first input light beam towards the first reflector 1504 for reflection of the first input light beam towards a first spot 1510a on the sample and the second input light beam towards a second spot 1510b on the sample.

The first reflector 1504 is optically coupled to receive a first light beam 1512a reflected from the first spot 1510a and to direct the first light beam 1512a towards the beam splitter/combiner 1502. The beam splitter/combiner 1502 is further optically coupled to receive a second light beam 1512b reflected from the second spot 1510b. The beam splitter/combiner 1502 is further configured to combine the first light beam 1512a and the second light beam 1512b to produce a combined light beam 1514 and is optically coupled to direct the combined light beam to the second reflector 1520. The second reflector 1520 is optically coupled to reflect the combined light beam 1514 to the input of the spectrometer 1506.

Figure 16:
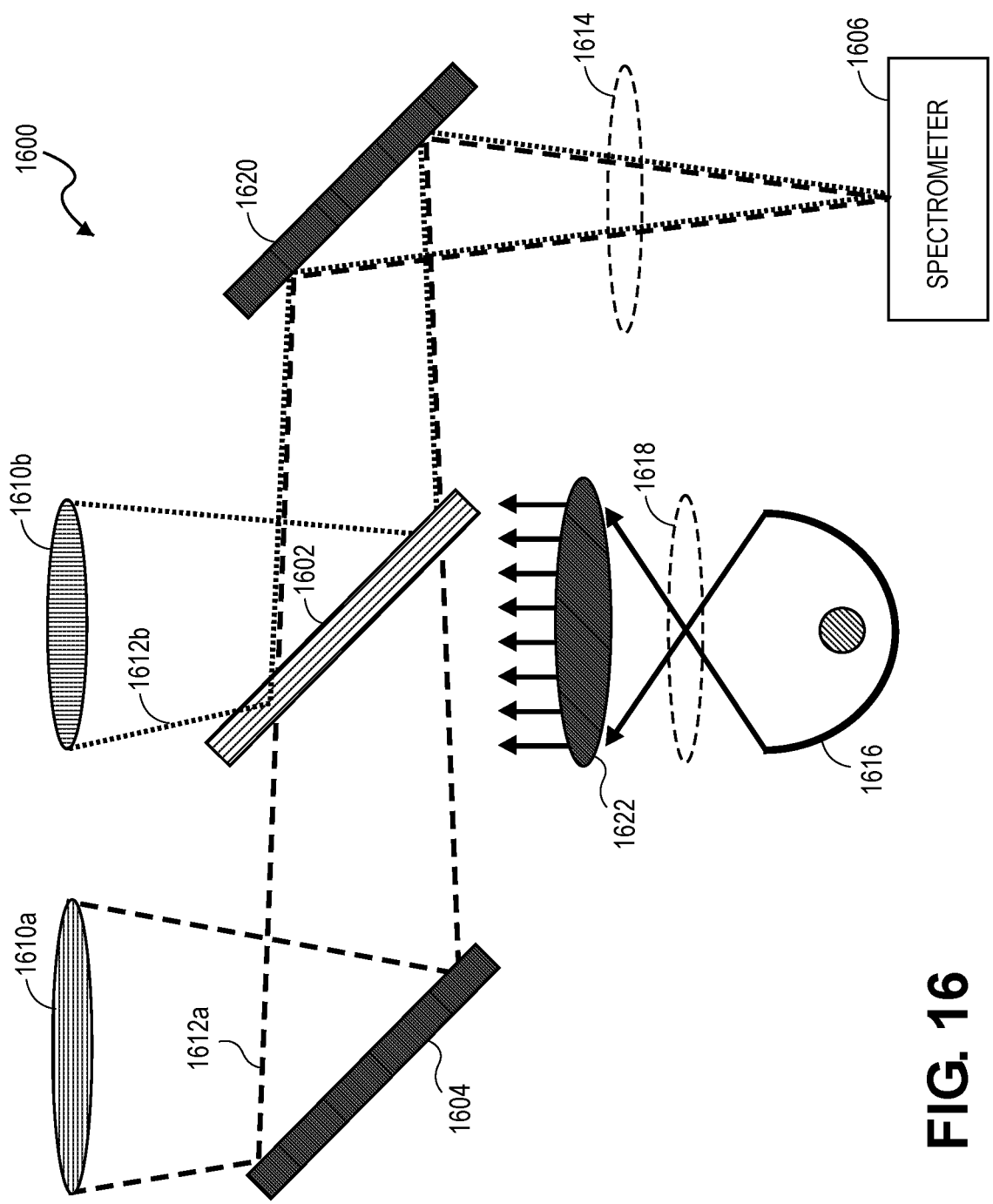
FIG. 16 is a diagram illustrating another example of an optical device configured to optically couple light from multiple spots on a sample to a spectrometer according to some aspects.

FIG. 16 is a diagram illustrating another example of an optical device 1600 configured to optically couple light from multiple spots 1610a and 1610b on a sample to a spectrometer 1606 according to some aspects. The optical device 1600 includes a beam splitter/combiner 1602, a first reflector 1604, a second reflector 1620, and a lens 1622. In the example shown in FIG. 16, the lens 1622 is optically coupled to receive an input light beam 1618 from a light source 1616 and to direct the input light beam 1618 towards the beam splitter/combiner 1602. In this example, the light source 1616 is positioned below the sample. In some examples, the lens 1622 may be configured for collimation of the input light beam 1618 or other suitable transformation of the input light beam 1618 to enhance the coupling of light into the spectrometer 1606. The lens 1622 may be, for example, a convex lens, concave lens, aspheric lens, or freeform lens.

The beam splitter/combiner 1602 is configured to split the input light beam into first and second input light beams. The beam splitter/combiner 1602 is further optically coupled to direct the first input light beam towards the first reflector 1604 for reflection of the first input light beam towards a first spot 1610a on the sample and the second input light beam towards a second spot 1610b on the sample. The first reflector 1604 is optically coupled to receive a first light beam 1612a reflected from the first spot 1610a and to direct the first light beam 1612a towards the beam splitter/combiner 1602. The beam splitter/combiner 1602 is further optically coupled to receive a second light beam 1612b reflected from the second spot 1610b. The beam splitter/combiner 1602 is further configured to combine the first light beam 1612a and the second light beam 1612b to produce a combined light beam 1614 and is optically coupled to direct the combined light beam to the second reflector 1620. The second reflector 1620 is optically coupled to reflect the combined light beam 1614 to the input of the spectrometer 1606.

It should be understood that lenses may be added in other parts of the light path for collimation, focusing, or other transformation of the light beams to further enhance the coupling of light into the spectrometer 1606. For example, lenses may be added between the spots 1610a and 1610b and the first reflector 1604 and beam splitter/combiner 1602, respectively. As another example, a lens may be added between the first reflector 1604 and the beam splitter/combiner 1602. As yet another example, a lens may be added between the beam splitter/combiner 1602 and the second reflector 1620 and/or between the second reflector 1620 and the spectrometer 1606. The addition of lenses may be independent of the configuration of the light source(s) 1618 (e.g., illumination from the side of the sample, from the bottom of the sample using one or more light sources, or from the top of the sample).

Figure 17:
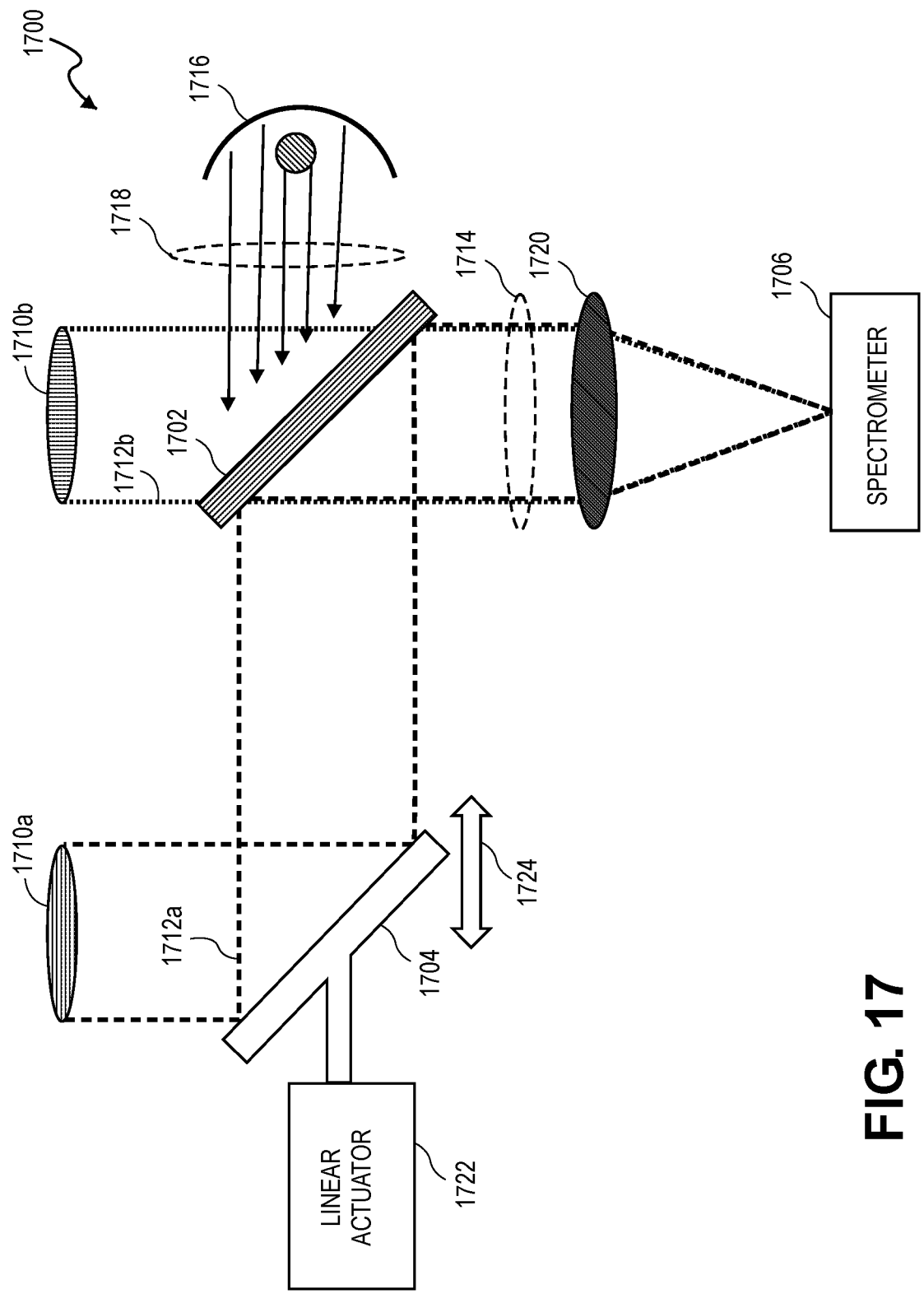
FIG. 17 is a diagram illustrating another example of an optical device configured to optically couple light from multiple spots on a sample to a spectrometer according to some aspects.

FIG. 17 is a diagram illustrating another example of an optical device 1700 configured to optically couple light from multiple spots 1710a and 1710b on a sample to a spectrometer 1706 according to some aspects. The optical device 1700 includes a beam splitter/combiner 1702, a reflector 1704, and a lens 1720. To increase the extended spot area collected by the spectrometer 1706, the optical device 1700 further includes a linear actuator 1722 coupled to the reflector 1704 to move the reflector 1704 and cause a displacement 1724 thereof.

In the example shown in FIG. 17, the beam splitter/combiner 1702 is optically coupled to receive an input light beam 1718 from a light source 1716. In this example, the light source 1716 is positioned to the side of the sample. The beam splitter/combiner 1702 is configured to split the input light beam 1718 into first and second input light beams. The beam splitter/combiner 1702 is further optically coupled to direct the first input light beam towards the reflector 1704 for reflection of the first input light beam towards a first spot 1710a on the sample and the second input light beam towards a second spot 1710b on the sample. The reflector 1704 is optically coupled to receive a first light beam 1712a reflected from the first spot 1710a and to direct the first light beam 1712a towards the beam splitter/combiner 1702. The beam splitter/combiner 1702 is further optically coupled to receive a second light beam 1712b reflected from the second spot 1710b and to combine the first light beam 1712a and the second light beam 1712b to produce a combined light beam 1714 for input to the spectrometer 1706 via the lens 1720. By moving the reflector 1704 back and forth using the linear actuator 1722, the optical device 1700 can scan the sample at different respective first spots 1710a, thus producing a larger extended spot area and further increasing the field of view of the spectrometer 1706.

Figure 18:
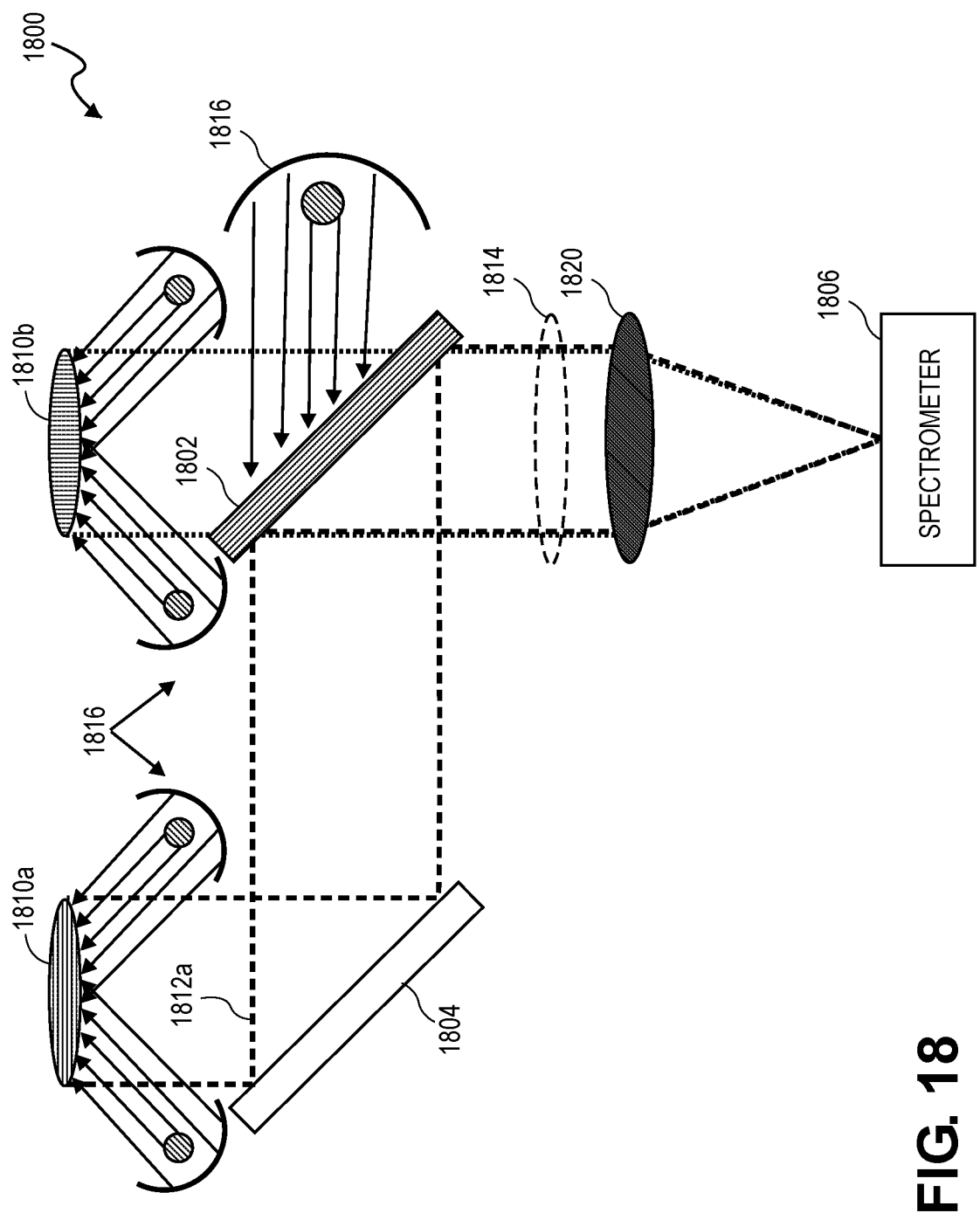
FIG. 18 is a diagram illustrating another example of an optical device configured to optically couple light from multiple spots on a sample to a spectrometer according to some aspects.

FIG. 18 is a diagram illustrating another example of an optical device 1800 configured to optically couple light from multiple spots 1810a and 1810b on a sample to a spectrometer 1806 according to some aspects. The optical device 1800 includes a beam splitter/combiner 1802, a reflector 1804, and a lens 1818.

In the example shown in FIG. 18, illumination of the spots 1810a and 1810b is achieved using multiple light sources 1816 positioned under the spots 1810a and 1810b and to the side of the beam splitter/combiner 1802. The reflector 1804 is optically coupled to receive a first light beam 1812a reflected from the first spot 1810a and to direct the first light beam 1812a towards the beam splitter/combiner 1802. The beam splitter/combiner 1802 is further optically coupled to receive a second light beam 1412b reflected from the second spot 1810b and to combine the first light beam 1812a and the second light beam 1812b to produce a combined light beam 1814 for input to the spectrometer 1806 via the lens 1818.

Figure 19:
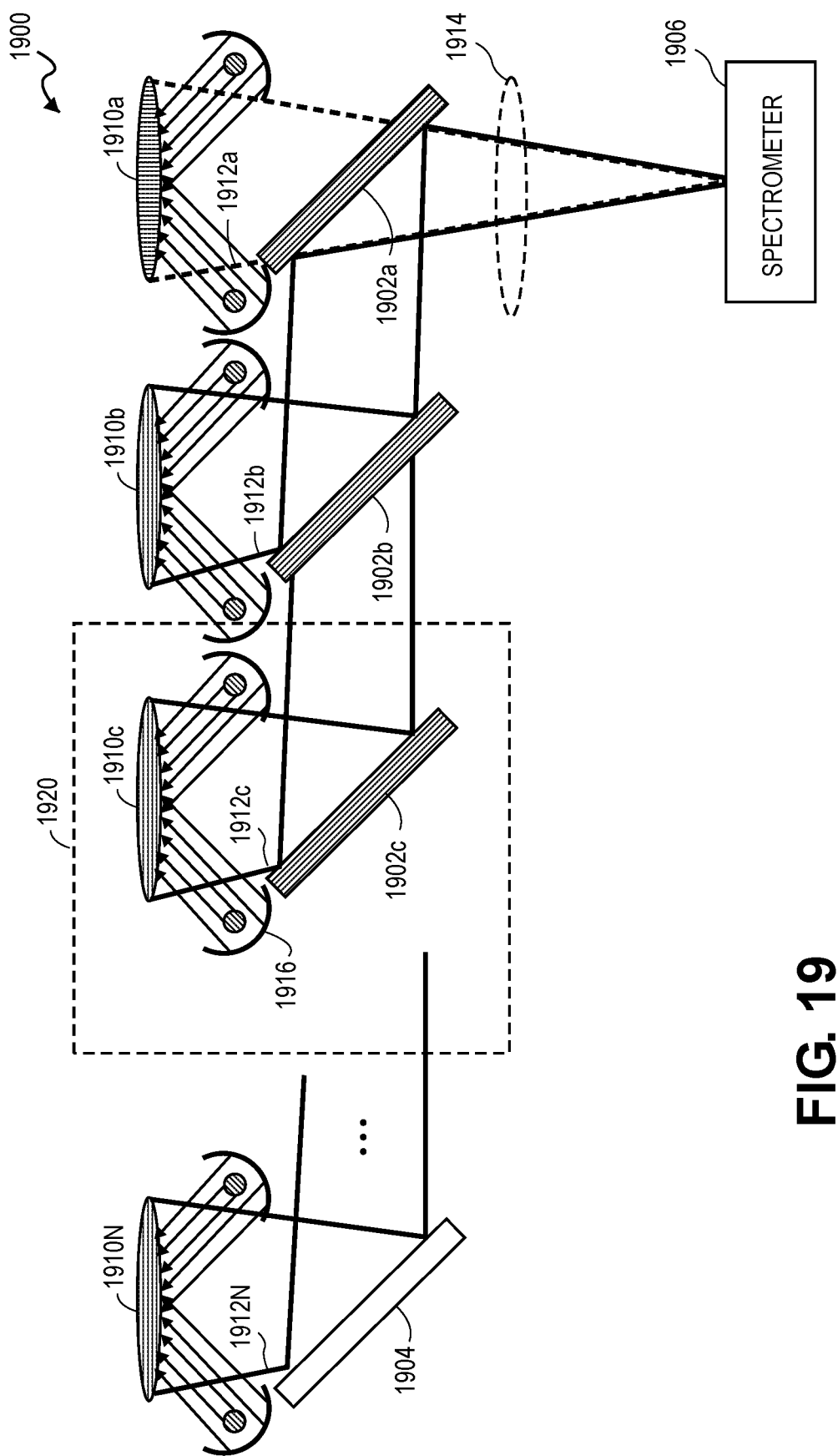
FIG. 19 is a diagram illustrating another example of an optical device configured to optically couple light from multiple spots on a sample to a spectrometer according to some aspects.

FIG. 19 is a diagram illustrating another example of an optical device 1900 configured to optically couple light from multiple spots 1910a, 1910b, 1910c, . . . 1910N on a sample to a spectrometer 1906 according to some aspects. The optical device 1900 includes a reflector 1904 and a plurality of beam splitter/combiners 1902a, 1902b, 1902c (three of which are shown for convenience). The optical device 1900 further includes a plurality of light sources 1916 positioned under the spots 1910a . . . 1910N for illumination thereof. Each of the beam splitter/combiners 1902a-1902c and reflector 1904, together with the corresponding light sources 1916, may form a respective coupling element 1920 for coupling light from one of the spots 1910a-1910N. The coupling elements 1920 are arranged as a chain of coupling elements. The reflector 1904 and corresponding light sources 1916 may form a final coupling element in the chain of coupling elements.

In the example shown in FIG. 19, the reflector 1904 is optically coupled to receive an Nth light beam 1912N reflected from the Nth spot 1910b and to direct the Nth light beam 1912N towards the plurality of beam splitter/combiners 1902a-1902c. The beam splitter/combiners 1902a-1902c are each further optically coupled to receive a respective light beam 1912a-1912c reflected from the corresponding spot 1910a-1910c and to combine the respective light beam 1912a-1912c with the light beam 1912N provided by the reflector 1904 and other light beams provided by previous coupling elements 1920 in the chain of coupling elements to produce a final combined light beam 1914 for input to the spectrometer 1906.

Figure 20:
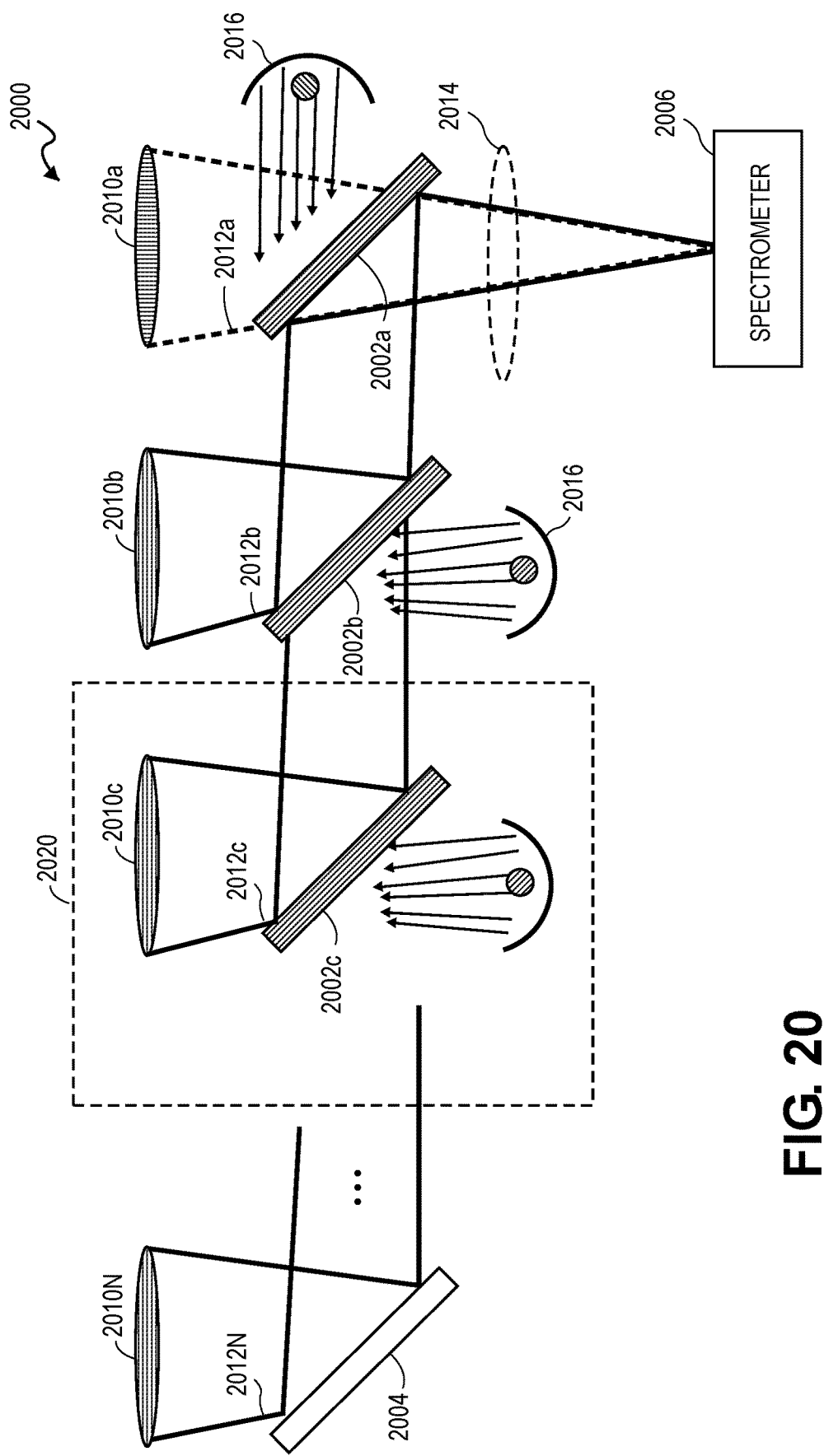
FIG. 20 is a diagram illustrating another example of an optical device configured to optically couple light from multiple spots on a sample to a spectrometer according to some aspects.

FIG. 20 is a diagram illustrating another example of an optical device 2000 configured to optically couple light from multiple spots 2010a, 2010b, 2010c, . . . 2010N on a sample to a spectrometer 2006 according to some aspects. The optical device 2000 includes a reflector 2004 and a plurality of beam splitter/combiners 2002a, 2002b, 2002c (three of which are shown for convenience). The optical device 2000 further includes a plurality of light sources 2016 associated with the beam splitters/combiners 2002a-2002c. In the example shown in FIG. 20, a single light source 2016 may be associated with each beam splitter/combiner 2002a-2002c to reduce the number of light sources as compared to the optical device configuration shown in FIG. 19.

Each beam splitter/combiner 2002a-2002c and corresponding light source 2016 may form a respective coupling element 2020 for coupling light from one of the spots 2010a-2010c. The coupling elements 2020 are arranged as a chain of coupling elements. In a first coupling element 2020 including beam splitter/combiner 2002a, the corresponding light source 2016 is shown positioned to the side of the beam splitter/combiner 2002a, whereas in the other coupling elements 2020, the light source 2016 may be positioned under the beam splitter/combiner 2002b and 2002c. In addition, the reflector 2004 may form a final coupling element in the chain of coupling elements. In this example, the reflector 2004 is a passive coupling element that receives illumination from the other coupling elements 2020 in the chain.

In the example shown in FIG. 20, the reflector 2004 is optically coupled to receive an input light beam from a last beam splitter/combiner 2002c in the chain of coupling elements 2020 and to direct the input light beam towards the Nth spot 2010N. The reflector 2004 is further optically coupled to receive an Nth light beam 2012N reflected from the Nth spot 2010b and to direct the Nth light beam 2012N towards the plurality of beam splitter/combiners 2002a-2002c. The beam splitter/combiners 2002a-2002c are each further optically coupled to receive a respective light beam 2012a-2012c reflected from the corresponding spot 2010a-2010c and to combine the respective light beam 2012a-2012c with the light beam 2012N provided by the reflector 2004 and other light beams provided by previous coupling elements 2020 in the chain of coupling elements to produce a final combined light beam 2014 for input to the spectrometer 2006.

Figure 21:
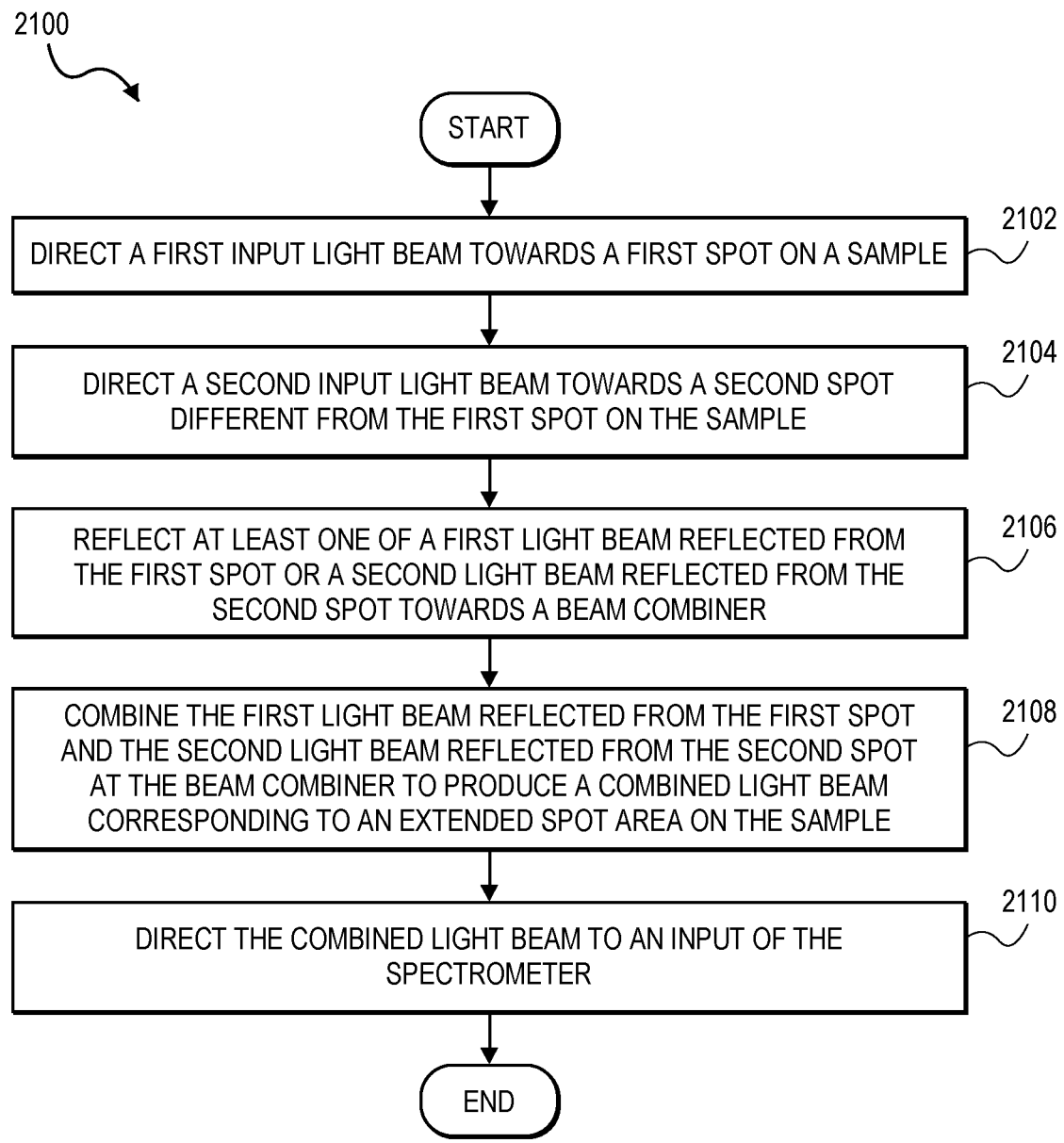
FIG. 21 is a flow chart illustrating an exemplary method for simultaneously coupling light from multiple spots on a sample to a spectrometer according to some aspects.

FIG. 21 is a flow chart illustrating an exemplary method 2100 for simultaneously coupling light from multiple spots on a sample to a spectrometer according to some aspects. As described below, some or all illustrated features may be omitted in a particular implementation within the scope of the present disclosure, and some illustrated features may not be required for implementation of all embodiments. In some examples, the method may be performed by the optical device 200, as described above and illustrated in FIG. 2, or by any configuration of the optical device, such as the configurations shown in FIGS. 3-20.

At block 2102, the optical device may direct a first input light beam towards a first spot on a sample. At block 2104, the optical device may direct a second input light beam towards a second spot on a sample. In some examples, the first and second input light beams may be generated by one or more light sources and directed towards the first and second spots, respectively, by the light source(s) and/or various reflectors and/or beam splitters.

At block 2106, the optical device may reflect at least one of a first light beam reflected from the first spot or a second light beam reflected from the second spot towards a beam combiner. In some examples, the optical device may include a single reflector for reflecting the first light beam towards the beam combiner. In this example, the beam combiner may be optically coupled to directly receive the second light beam reflected from the second spot. In other examples, the optical device may include a first reflector for reflecting the first light beam towards the beam combiner and a second reflector for reflecting the second light beam towards the beam combiner.

At block 2108, the optical device may combine the first light beam reflected from the first spot and the second light beam reflected from the second spot at the beam combiner to produce a combined light beam. The combined light beam corresponds to an extended spot area on the sample that includes the first spot and the second spot. For example, the extended spot area may include a summation of the collected light coming from each spot. The beam combiner may have any suitable configuration. For example, the beam combiner may include a beam splitter/combiner, or may be prism-shaped, pyramid-shaped, or cone-shaped. At block 2110, the optical device may direct the combined light beam to an input of the spectrometer. In some examples, the combined light beam may be directed directly from the beam combiner to the input of the spectrometer. In other examples, the combined light beam may be directed to the input of the spectrometer via a reflector, lens, or other optical component. In some examples, the optical device may combine a plurality of light beams reflected from a plurality of spots on the sample using a plurality of unit cells or a plurality of coupling elements, as described above.

The following provides an overview of examples of the present disclosure.

Example 1: An optical device, comprising: a beam combiner optically coupled to receive a first light beam from a first spot on a sample and a second light beam from a second spot different from the first spot on the sample, wherein the beam combiner is further configured to combine the first light beam and the second light beam to produce a combined light beam; at least one reflector optically coupled to reflect at least one of the first light beam or the second light beam from the sample towards the beam combiner; and a spectrometer optically coupled to receive the combined light beam at an input thereof and configured to obtain a spectrum of an extended spot area on the sample based on the combined light beam, wherein the extended spot area comprises the first spot and the second spot.

Example 2: The optical device of example 1, wherein the at least one reflector comprises a first reflector and a second reflector.

Example 3: The optical device of example 2, wherein the first reflector and the second reflector each comprise a 45 degree flat mirror.

Example 4: The optical device of example 2, wherein the first reflector and the second reflector each comprise a curved mirror.

Example 5: The optical device of any of examples 1 through 4, wherein the beam combiner comprises two mirrors perpendicular to each other.

Example 6: The optical device of any of examples 1 through 5, further comprising: a first unit cell comprising the first reflector and a first flat mirror of the beam combiner; and a second unit cell comprising the second reflector and a second flat mirror of the beam combiner.

Example 7: The optical device of example 6, further comprising: a plurality of unit cells comprising the first unit cell and the second unit cell configured in a tree structure, wherein each of the plurality of unit cells is configured to couple light from at least one spot on the sample towards the beam combiner.

Example 8: The optical device of any of examples 1 through 7, further comprising: an apparatus comprising the first reflector, the second reflector, and the beam combiner; and a rotating device coupled to the apparatus and configured to rotate the apparatus around a central axis thereof to generate a scanned area on the sample comprising the extended spot area.

Example 9: The optical device of example 8, wherein: the scanned area comprises a ring having a diameter controlled by a spacing between the first reflector and the second reflector.

Example 10: The optical device of any of examples 1 through 9, further comprising: a first lens optically coupled between the first reflector and the beam combiner; and a second lens optically coupled between the second reflector and the beam combiner.

Example 11: The optical device of any of examples 1 through 10, further comprising: a first lens optically coupled between the sample and the first reflector, and a second lens optically coupled between the sample and the second reflector.

Example 12: The optical device of any of examples 1 through 11, further comprising: a lens optically coupled between the beam combiner and the spectrometer.

Example 13: The optical device of any of examples 1 through 12, further comprising: a linear actuator coupled to the at least one reflector and configured to displace the at least one reflector to scan the sample at different respective spots.

Example 14: The optical device of any of examples 1 through 4 and 6 through 13, wherein the beam combiner comprises a quadrilateral pyramid beam combiner and the at least one reflector comprises four reflectors, each optically coupled to direct a respective light beam from a respective spot on the sample towards the quadrilateral pyramid beam combiner.

Example 15: The optical device of any of examples 1 through 4 and 6 through 13, wherein the beam combiner comprises a cone beam combiner and the at least one reflector comprises a circular reflector optically coupled to direct a plurality of light beams from a plurality of spots on the sample towards the cone beam combiner.

Example 16: The optical device of any of examples 1 through 4 and 6 through 13, wherein: the beam combiner is further optically coupled to split an input light beam into a first input light beam and a second input light beam and to direct the first input light beam towards the at least one reflector and the second input light beam towards the second spot on the sample, the beam combiner is further optically coupled to receive the second light beam reflected from the second spot, and the at least one reflector is optically coupled to direct the first input light beam towards the first spot on the sample and to direct the first light beam reflected from the first spot towards the beam combiner.

Example 17: The optical device of example 16, further comprising: an additional reflector optically coupled to reflect the combined light beam from the beam combiner to the input of the spectrometer.

Example 18: The optical device of any of examples 1 through 17, further comprising: a light source configured to generate the input light beam.

Example 19: The optical device of example 18, further comprising: a lens optically coupled between the light source and the beam combiner.

Example 20: The optical device of example 18, wherein: the beam combiner comprises a plurality of beam splitter/combiners and the light source comprises a plurality of light sources, each of the plurality of beam splitter/combiners and at least one corresponding light source of the plurality of light sources forms a respective coupling element of a plurality of coupling elements arranged in a chain of coupling elements, the reflector comprises a final coupling element in the chain of coupling elements, and each of the plurality of coupling elements and the final coupling element being configured to couple light from a respective spot on the sample towards the spectrometer via the chain of coupling elements.

Example 21: The optical device of any of examples 1 through 19, further comprising: at least a first light source configured to generate a first input light beam for direction towards the first spot and a second light source configured to generate a second input light beam for direction towards the second spot.

Example 22: A method for coupling light to a spectrometer using the optical device of any one of examples 1 through 21.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An optical device, comprising:
a beam combiner optically coupled to receive a first light beam from a first spot on a sample and a second light beam from a second spot different from the first spot on the same sample at the same time, wherein the first spot and the second spot each comprise a respective spot area, wherein the beam combiner is further configured to combine the first light beam and the second light beam to produce a combined light beam;
at least one reflector optically coupled to reflect at least one of the first light beam or the second light beam from the sample towards the beam combiner; and
a spectrometer optically coupled to receive the combined light beam at an input thereof and configured to obtain a spectrum of an extended spot area on the sample based on the combined light beam, wherein the extended spot area comprises the first spot and the second spot.

2. The optical device of claim 1, wherein the at least one reflector comprises a first reflector and a second reflector.

3. The optical device of claim 2, wherein the first reflector and the second reflector each comprise a 45 degree flat mirror.

4. The optical device of claim 2, wherein the first reflector and the second reflector each comprise a curved mirror.

5. The optical device of claim 2, wherein the beam combiner comprises two mirrors perpendicular to each other.

6. The optical device of claim 2, further comprising:
a first unit cell comprising the first reflector and a first flat mirror of the beam combiner; and
a second unit cell comprising the second reflector and a second flat mirror of the beam combiner.

7. The optical device of claim 6, further comprising:
a plurality of unit cells comprising the first unit cell and the second unit cell configured in a tree structure, wherein each of the plurality of unit cells is configured to couple light from at least one spot on the sample towards the beam combiner.

8. The optical device of claim 2, further comprising:
an apparatus comprising the first reflector, the second reflector, and the beam combiner; and
a rotating device coupled to the apparatus and configured to rotate the apparatus around a central axis thereof to generate a scanned area on the sample comprising the extended spot area.

9. The optical device of claim 8, wherein:
the scanned area comprises a ring having a diameter controlled by a spacing between the first reflector and the second reflector.

10. The optical device of claim 2, further comprising:
a first lens optically coupled between the first reflector and the beam combiner; and
a second lens optically coupled between the second reflector and the beam combiner.

11. The optical device of claim 2, further comprising:
a first lens optically coupled between the sample and the first reflector, and
a second lens optically coupled between the sample and the second reflector.

12. The optical device of claim 1, further comprising:
a lens optically coupled between the beam combiner and the spectrometer.

13. The optical device of claim 1, further comprising:
a linear actuator coupled to the at least one reflector and configured to displace the at least one reflector to scan the sample at different respective spots.

14. The optical device of claim 1, wherein the beam combiner comprises a quadrilateral pyramid beam combiner and the at least one reflector comprises four reflectors, each optically coupled to direct a respective light beam from a respective spot on the sample towards the quadrilateral pyramid beam combiner.

15. The optical device of claim 1, wherein the beam combiner comprises a cone beam combiner and the at least one reflector comprises a circular reflector optically coupled to direct a plurality of light beams from a plurality of spots on the sample towards the cone beam combiner.

16. The optical device of claim 1, wherein:
the beam combiner is further optically coupled to split an input light beam into a first input light beam and a second input light beam and to direct the first input light beam towards the at least one reflector and the second input light beam towards the second spot on the sample,
the beam combiner is further optically coupled to receive the second light beam reflected from the second spot, and
the at least one reflector is optically coupled to direct the first input light beam towards the first spot on the sample and to direct the first light beam reflected from the first spot towards the beam combiner.

17. The optical device of claim 16, further comprising:
an additional reflector optically coupled to reflect the combined light beam from the beam combiner to the input of the spectrometer.

18. The optical device of claim 17, further comprising:
a light source configured to generate the input light beam.

19. The optical device of claim 18, further comprising:
a lens optically coupled between the light source and the beam combiner.

20. The optical device of claim 18, wherein:
the beam combiner comprises a plurality of beam splitter/combiners and the light source comprises a plurality of light sources,
a respective one of the plurality of beam splitter/combiners and a corresponding light source of the plurality of light sources forming a respective coupling element of a plurality of coupling elements arranged in a chain of coupling elements, the additional reflector comprises a final coupling element in the chain of coupling elements, and each of the plurality of coupling elements and the final coupling element being configured to couple light from a respective spot on the sample towards the spectrometer via the chain of coupling elements.

21. The optical device of claim 1, further comprising:

at least a first light source configured to generate a first input light beam for direction towards the first spot and a second light source configured to generate a second input light beam for direction towards the second spot.

22. A method for coupling light to a spectrometer, comprising:

directing a first input light beam towards a first spot on a sample and a second input light beam towards a second spot different from the first spot on the same sample at the same time, wherein the first spot and the second spot each comprise a respective spot area;

reflecting at least one of a first light beam reflected from the first spot or a second light beam reflected from the second spot towards a beam combiner;

combining the first light beam reflected from the first spot and the second light beam reflected from the second spot at the beam combiner to produce a combined light beam associated with an extended spot area on the sample, wherein the extended spot area comprises the first spot and the second spot; and directing the combined light beam to an input of the spectrometer.

23. The method of claim 22, further comprising:

rotating an apparatus comprising the beam combiner around a central axis thereof to generate a scanned area on the sample, wherein the scanned area comprises the extended spot area.

24. The method of claim 22, further comprising:

displacing the at least one reflector to scan the sample at different respective spots.

25. The method of claim 22, wherein the beam combiner comprises a quadrilateral pyramid beam combiner, and wherein the reflecting at least one of the first light beam reflected from the first spot or the second light beam reflected from the second spot towards the beam combiner further comprises:

reflecting the first light beam, the second light, a third light beam reflected from a third spot on the sample, and a fourth light beam reflected from a fourth spot on the sample towards the quadrilateral pyramid beam combiner to produce the combined light beam.

26. The method of claim 22, wherein the beam combiner comprises a cone beam combiner, and wherein the reflecting at least one the first light beam reflected from the first spot or the second light beam reflected from the second spot towards the beam combiner further comprises:

reflecting a plurality of light beams from a plurality of spots on the sample towards the cone beam combiner.

27. The method of claim 22, further comprising:

splitting the input light beam into the first input light beam and the second input light beam; and directing the first input light beam towards a reflector for reflection of the first input light beam towards the first spot on the sample and the second input light beam towards the second spot on the sample.

28. The method of claim 22, further comprising:

reflecting the combined light beam from the beam combiner to the input of the spectrometer.

\* \* \* \* \*